(12) United States Patent
Mihail

(10) Patent No.: US 11,377,880 B2
(45) Date of Patent: Jul. 5, 2022

(54) VEHICULAR LATCH ASSEMBLY WITH LATCH MECHANISM HAVING SELF-LOCKING RATCHET

(71) Applicant: Magna Closures Inc., Newmarket (CA)

(72) Inventor: Adrian Mihail, Richmond Hill (CA)

(73) Assignee: MAGNA CLOSURES INC., Newmarket (CA)

( * ) Notice: Subject to any disclaimer, the term of this patent is extended or adjusted under 35 U.S.C. 154(b) by 939 days.

(21) Appl. No.: 15/985,825

(22) Filed: May 22, 2018

(65) Prior Publication Data

US 2018/0340358 A1 Nov. 29, 2018

Related U.S. Application Data

(60) Provisional application No. 62/510,793, filed on May 25, 2017.

(51) Int. Cl.
*E05B 77/36* (2014.01)
*B60N 2/015* (2006.01)
(Continued)

(52) U.S. Cl.
CPC .......... *E05B 77/36* (2013.01); *B60N 2/01583* (2013.01); *B60N 2/366* (2013.01);
(Continued)

(58) Field of Classification Search
CPC ........... Y10T 292/1047; Y10T 292/108; Y10T 292/0949; Y10T 292/1043; Y10T 292/1075; Y10T 292/1092; Y10T 292/0945; Y10T 292/1078; Y10T 292/688; Y10T 292/1039; Y10T 292/1046; Y10T 292/1048; Y10T 292/1059; Y10T 292/1077; Y10S 292/23; Y10S 292/56;
(Continued)

(56) References Cited

U.S. PATENT DOCUMENTS 5,577,782 A * 11/1996 Johnson .................. E05B 81/06
292/201
5,938,252 A * 8/1999 Uemura .................. E05B 81/64
292/201
(Continued)

FOREIGN PATENT DOCUMENTS

WO 2008061366 A1 5/2008

*Primary Examiner* — Mark A Williams
(74) *Attorney, Agent, or Firm* — Dickinson Wright PLLC

(57) ABSTRACT

A latch assembly for a vehicular latching system configured to provide an anti-chucking locking function in cooperation with a latch mechanism. The latch mechanism has a ratchet that is moveable by a striker between a striker release position, a striker capture position, and a striker over-travel position. A pawl is operable in a ratchet holding position to hold the ratchet when the ratchet is in the striker capture position and operable in a ratchet releasing position to release the ratchet to allow the ratchet to return to its striker release position. A latch release mechanism operates to move the pawl between its ratchet holding and ratchet releasing positions. The anti-chuck locking function is provided by the pawl having a lock tooth and the ratchet having a lock notch for locking engagement therebetween when the pawl holds the ratchet in its striker capture position for muting vibrations of the latch assembly.

13 Claims, 30 Drawing Sheets

(51) Int. Cl.
*B60N 2/36* (2006.01)
*E05B 83/38* (2014.01)
*E05B 79/20* (2014.01)
*E05B 79/22* (2014.01)

(52) U.S. Cl.
CPC ........... *B60N 2205/20* (2013.01); *E05B 79/20* (2013.01); *E05B 79/22* (2013.01); *E05B 83/38* (2013.01)

(58) Field of Classification Search
CPC .. B60N 2/01583; B60N 2/3011; B60N 2/305; B60N 2/366; B60N 2/01541; B60N 2205/20; E05B 77/36; E05B 79/20; E05B 79/22; E05B 83/38
See application file for complete search history.

(56) References Cited

U.S. PATENT DOCUMENTS

| | | | |
|---|---|---|---|
| 6,048,002 A * | 4/2000 | Ohta | E05B 81/20 292/201 |
| 7,926,858 B2 * | 4/2011 | Otsuka | B60N 2/01583 292/216 |
| 10,458,155 B2 | 10/2019 | Yu et al. | |
| 10,767,396 B2 | 9/2020 | Distefano et al. | |
| 2001/0024040 A1 * | 9/2001 | Spurr | E05B 81/16 292/216 |
| 2006/0055181 A1 * | 3/2006 | Berghahn | E05B 81/20 292/216 |
| 2012/0161456 A1 * | 6/2012 | Riedmayr | E05B 83/24 292/226 |
| 2014/0049056 A1 * | 2/2014 | Scholz | E05B 85/243 292/200 |
| 2014/0054903 A1 * | 2/2014 | Kim | E05B 83/24 292/96 |
| 2014/0284942 A1 * | 9/2014 | Wittelsbuerger | E05B 85/243 292/92 |
| 2015/0076835 A1 * | 3/2015 | Mitchell | E05B 85/20 292/194 |
| 2015/0233156 A1 * | 8/2015 | Scholz | E05B 85/20 292/200 |
| 2016/0108653 A1 * | 4/2016 | Guelkan | E05B 77/04 292/341.17 |

* cited by examiner

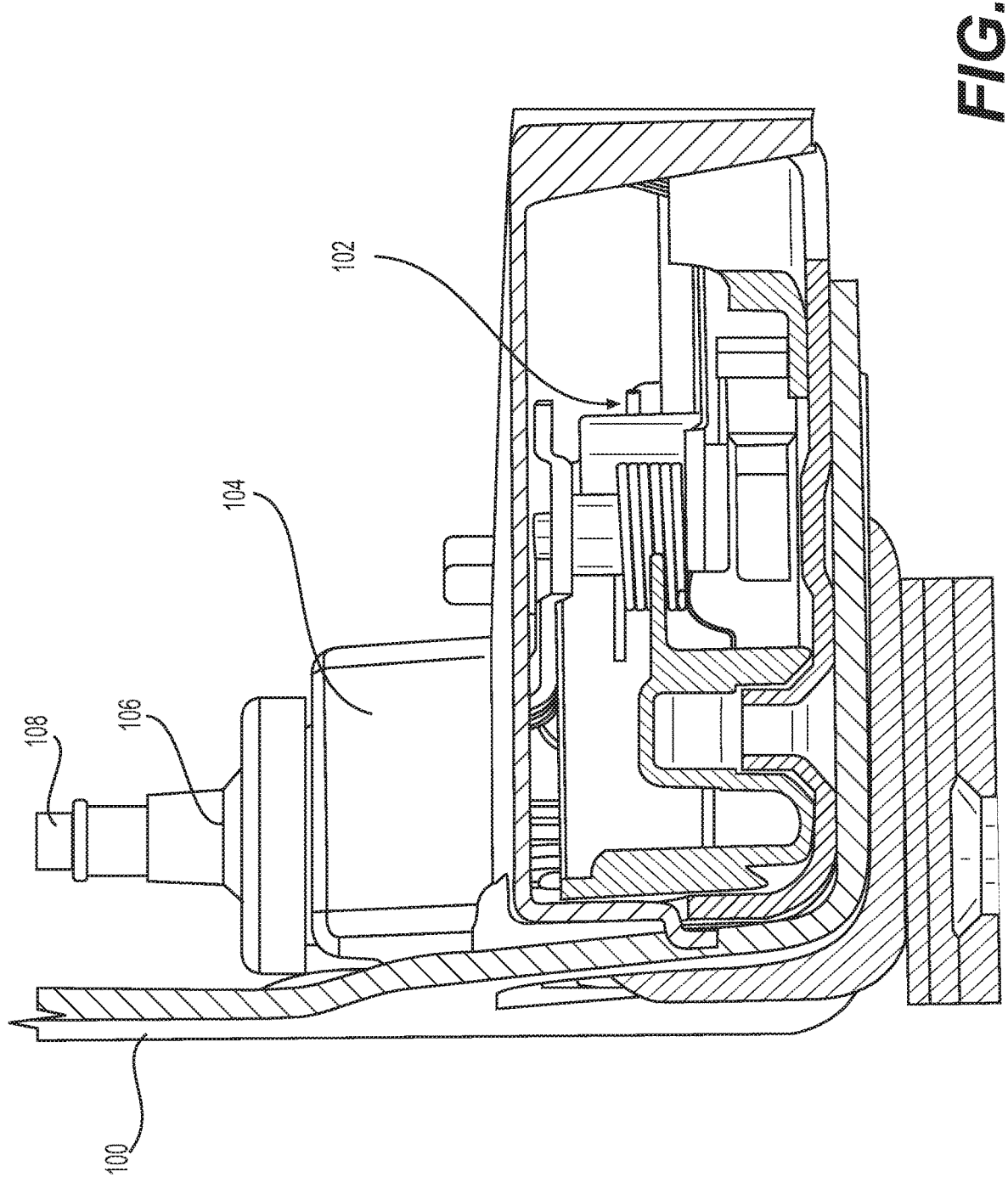

VEHICULAR LATCH ASSEMBLY WITH LATCH MECHANISM HAVING SELF-LOCKING RATCHET

CROSS-REFERENCE TO RELATED APPLICATIONS

This application claims the benefit of U.S. provisional application No. 62/510,793, filed on May 25, 2017. The entire disclosure of the above application is incorporated herein by reference.

FIELD

The present disclosure relates generally to latching systems for motor vehicles. More specifically, the present disclosure relates to a vehicular closure latch assembly equipped with an anti-chucking latch mechanism and a vehicular seat latch assembly equipped with the anti-chucking latch mechanism.

BACKGROUND

This section provides background information related to vehicular latching systems and is not necessarily prior art to the inventive concepts associated with the present disclosure.

A typical motor vehicle is equipped with one or more latching systems such as, for example, door latches and seat latches. Virtually all motor vehicles are equipped with at least one pair of doors to provide access to a passenger compartment. Specifically, most vehicles include driver-side and passenger-side swing doors that are pivotably supported from the vehicle body to move between closed and open positions. These doors are each equipped with a closure latch assembly having a latch mechanism operable in a latched mode to hold the door in its closed position and in an unlatched mode to permit movement of the door to its open position. The closure latch assembly is also equipped with a latch release mechanism that is selectively actuated (manually via a handle-actuated latch release system and/or via a power-operated latch release system) to shift the latch mechanism from its latched mode into its unlatched mode.

Many vehicles are equipped with multiple side (i.e. front and rear) doors for access to the passenger compartment. Most commonly, when viewed from the front of the vehicle, the front and rear side doors are hinged proximate their front edge. Specifically, the front doors are hinged to a front structural pillar (i.e. the A-pillar) while the rear doors are hinged to an intermediate structural pillar (i.e. the B-pillar) which is situated between the front and rear doors. The closure latch assembly associated with each front door is arranged to latch with a corresponding front striker fixed to the B-pillar. Likewise, the closure latch assembly associated with each rear door is arranged to latch with a corresponding rear striker fixed to a rearward sill portion of the rear door opening. In some vehicles, such as pick-up trucks with extended cabs, the vehicle body is formed with an enlarged door opening without a structural B-pillar. Such "pillar-less" dual-door closure systems typically include a front swing door pivotably hinged along its front edge to the front vertical structural portion (i.e. the A-pillar) of the enlarged door opening and a rear swing door pivotably hinged along its rear edge to a rear vertical structural portion (i.e. the C-pillar) of the enlarged door opening. The absence of the intermediate structural pillar (i.e. the B-pillar) requires that the rear door must latch along at least one of upper and lower portions of the enlarged door opening while the front door must latch directly to the rear door. Typically, the closure latch assembly in the rear door cannot be unlatched until the front door closure latch assembly has been released and the front door swung at least partially to its open position.

All closure latch assemblies are susceptible to relative movement between the ratchet and the striker due to movement of the ratchet between its primary striker capture position and a full or striker over-travel position. Normally this displacement is counterbalanced by the loads exerted by the door seals and internal latch bumpers. Unfortunately, for large and heavy doors the ability to increase the door seal loads and the latch bumper stiffness is ineffective to totally eliminate door vibrations, especially when the motor vehicle is being driven off road or on poor roads. As a result, an undesirable noise, commonly referred to as "chucking", occurs and is perceived as an undesirable disturbance by the vehicle occupants.

To this end, a great deal of development has been directed to "anti-chucking" latching systems for use in vehicular door systems, particularly for use in dual-door pillar-less closure arrangements. As noted, one recognized issue requiring corrective action is the elimination of door rattle or "chucking" noise that is generated at the latched interface between the front and rear doors during motive operation of the motor vehicle. One known anti-chucking solution employs a rubber bumper mounted to the striker to eliminate the chucking movement of the striker relative to the ratchet via a "wedging" function. However, high release effort, as well as high latching effort, are required to overcome this resilient wedging function.

Accordingly, a recognized need exists to address and overcome this known drawback by providing an anti-chucking solution in association with a latch assembly, particularly for use in closure latch assemblies in door latching systems and/or for use in seat latch systems.

SUMMARY

This section provides a general summary of the present disclosure and is not intended to be considered a comprehensive and exhaustive listing of its full scope or all aspects, objectives and features.

It is an aspect of the present disclosure to provide a latch assembly for a vehicular latching system having an anti-chucking function.

It is another aspect of the present disclosure to provide the latch assembly with a latch mechanism having a ratchet and a pawl configured to provide the anti-chucking function via a locking feature embodied as a self-locking ratchet.

It is a related aspect of the present disclosure to configure the latch assembly as a "closure" latch assembly for use in a vehicular closure system and equip the closure latch assembly with the latch mechanism providing the anti-chucking function via the locking feature defining the self-locking ratchet. The latch assembly may also be configured as a "seat" latch assembly for use in a vehicular seating system with the latch mechanism providing the anti-chucking function via the locking feature defining the self-locking ratchet.

It is another related aspect of the present disclosure to configure the latch assembly as a "closure" latch assembly for use in a vehicular closure system and which is equipped with a latch mechanism and an anti-chucking mechanism arranged to work cooperatively to provide the anti-chucking function.

It is another aspect of the present disclosure to configure the latch assembly as a "seat" latch assembly for use in vehicular seating systems and which is equipped with a latch mechanism and an anti-chucking mechanism arranged to work cooperatively to provide the anti-chucking function.

It is a related aspect to integrate the anti-chucking function into an engagement configuration established directly between the ratchet and the pawl of the latch mechanism such that upon retention of the ratchet by the pawl in a primary striker capture position all subsequent movement of the ratchet toward a full striker over-travel position is prevented. This engagement configuration includes a locking feature established between a lock tooth formed on the pawl and a lock notch formed in the ratchet.

In accordance with these and other aspects, the present disclosure provides a latch assembly for a latching system comprised of a latch mechanism having an anti-chucking locking feature. The latch mechanism includes a ratchet, a ratchet spring, a pawl, a pawl spring, and an anti-rattle lever. The ratchet is moveable between a striker release position, a striker capture position, and a striker over-travel position. The ratchet spring biases the ratchet toward its striker release position. The pawl is moveable between a ratchet holding position for holding the ratchet in its striker capture position and a ratchet releasing position for permitting the ratchet spring to forcibly move the ratchet to its striker release position. The pawl spring biases the pawl toward its ratchet holding position. The latch assembly also includes a latch release mechanism having a release lever and a release lever spring. The release lever is moveable between a non-actuated position for permitting the pawl to remain in its ratchet holding position and an actuated position for moving the pawl to its ratchet releasing position. The release lever spring biases the release lever toward its non-actuated position. The anti-rattle lever is moveable between a released position disengaged from the ratchet and an engaged position engaged with the ratchet. An anti-rattle lever spring biases the anti-rattle lever toward its released position. Movement of the ratchet in a closing direction from its striker release position to its striker over-travel position causes corresponding movement of the anti-rattle lever from its released position to its engaged position. Movement of the anti-rattle lever from its released position to its engaged position acts to move the pawl from its ratchet holding position toward its ratchet releasing position. Upon subsequent movement of the ratchet in a releasing direction from its striker over-travel position into its primary striker capture position, the pawl moves into its ratchet holding position whereby a locking tooth formed on the pawl is lockingly retained in a locking notch formed in the ratchet. As such, the pawl inhibits movement of the ratchet in both the closing direction and releasing direction so as to securely retain the striker within the ratchet and prevent undesirable chucking movement of the ratchet relative to the striker.

In accordance with these and other aspects, the present disclosure provides a latch assembly comprising a latch mechanism having a ratchet moveable between a striker release position, a striker capture position, and a striker over-travel position. A ratchet spring biases the ratchet toward its striker release position. A pawl is moveable between a ratchet holding position for holding the ratchet in its striker capture position and a ratchet releasing position for permitting the ratchet to move to its striker release position. A pawl spring biases the pawl toward its ratchet holding position. A latch release mechanism is operable for moving the pawl from its ratchet holding position into its ratchet releasing position. The latch mechanism has an anti-chuck locking feature configured such that the ratchet includes a lug segment defining a lock notch and the pawl includes a lock tooth arranged to be releaseably disposed within the lock notch when the ratchet is located in its striker capture position and the pawl is located in its ratchet holding position.

In accordance with these and other aspects, the present disclosure provides a latch assembly comprising a latch mechanism having a ratchet, a ratchet spring, a pawl, and a pawl spring, the ratchet including a lug segment defining a lock notch. The ratchet is moveable between a striker release position, a striker capture position, and a striker over-travel position, the ratchet spring biasing the ratchet toward its striker release position. The pawl includes a lock tooth and is moveable between a ratchet holding position whereat the pawl holds the ratchet in its striker capture position and a ratchet releasing position whereat the pawl is disengaged from the ratchet and permits the ratchet spring to drive the ratchet to its striker release position. The pawl spring biases the pawl towards its ratchet holding position. A latch release mechanism selectively moves the pawl from its ratchet holding position into its ratchet release position. The latch mechanism further has an anti-chuck locking feature established by the lock tooth on the pawl being seated within the lock notch on the ratchet when the ratchet is held in its striker capture position by the pawl in its ratchet holding position. The profile of the lock tooth and the lock notch being configured to inhibit movement of the ratchet in a ratchet releasing direction towards its striker release position and to inhibit movement of the ratchet in a ratchet closing direction towards its striker over-travel position.

In accordance with these and other aspects, the present disclosure provides a latch assembly comprising a latch mechanism having a ratchet, a ratchet spring, a pawl, and a pawl spring, the ratchet including a lug segment defining a lock notch. The ratchet is moveable between a striker release position, a striker capture position, and a striker over-travel position, the ratchet spring biasing the ratchet toward its striker release position. The pawl includes a lock tooth and is moveable between a ratchet holding position whereat the pawl holds the ratchet in its striker capture position and a ratchet releasing position whereat the pawl is disengaged from the ratchet and permits the ratchet spring to drive the ratchet to its striker release position. The pawl spring biases the pawl towards its ratchet holding position. A latch release mechanism selectively moves the pawl from its ratchet holding position into its ratchet release position. The latch mechanism further has an anti-chuck locking feature established by the lock tooth on the pawl being seated within the lock notch on the ratchet when the ratchet is held in its striker capture position by the pawl in its ratchet holding position. The profile of the lock tooth and the lock notch being configured to inhibit movement of the ratchet in a ratchet releasing direction towards its striker release position and to inhibit movement of the ratchet in a ratchet closing direction towards its striker over-travel position. The lug segment includes first and second cam surfaces located on opposite sides of the lock notch. In operation, the lock tooth on the pawl engages and rides along the first cam surface as the ratchet moves in a ratchet closing direction from its striker release position toward its striker capture position so as to hold the pawl in its ratchet releasing position. Movement of the ratchet in the ratchet closing direction from its striker capture position into its striker over-travel position causes the pawl spring to move the pawl toward its ratchet holding position until the lock tooth on the pawl engages the second cam surface of the lug segment on the ratchet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations and are not intended to limit the scope of the present disclosure.

FIGS. 5A and 5B are sectional views of the closure latch assembly shown in FIG. 4;

Figure 20:
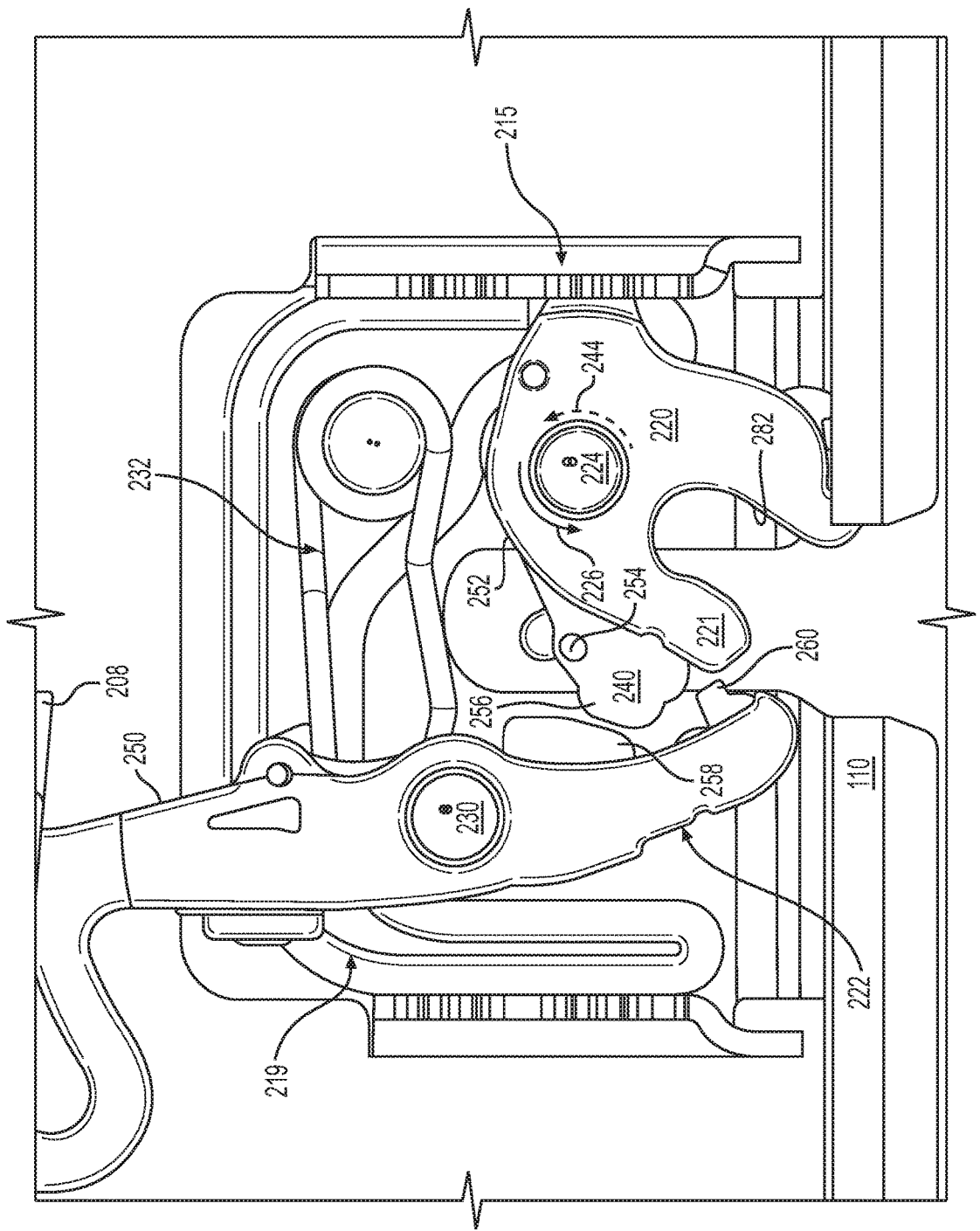
Figure 21:
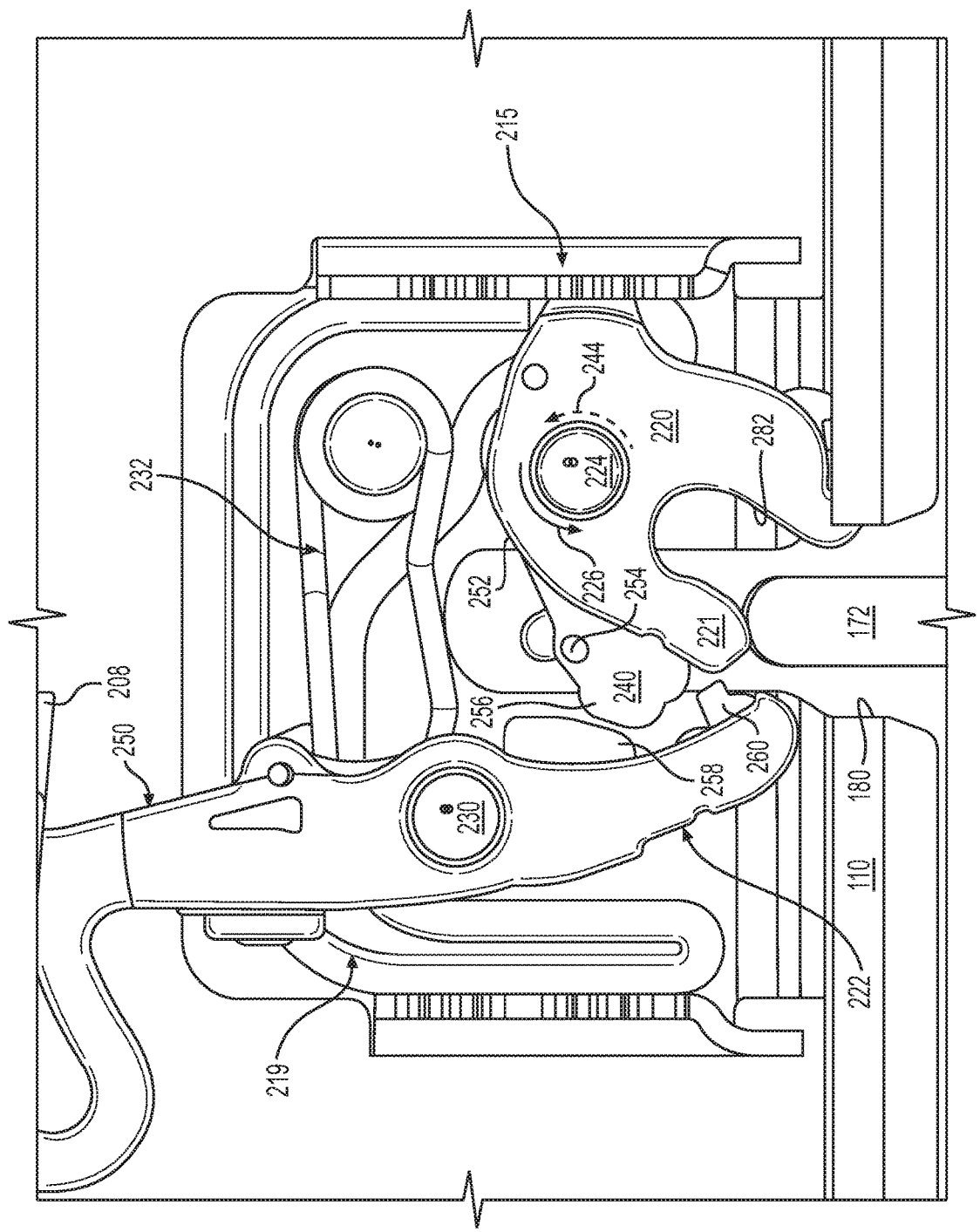
Figure 22:
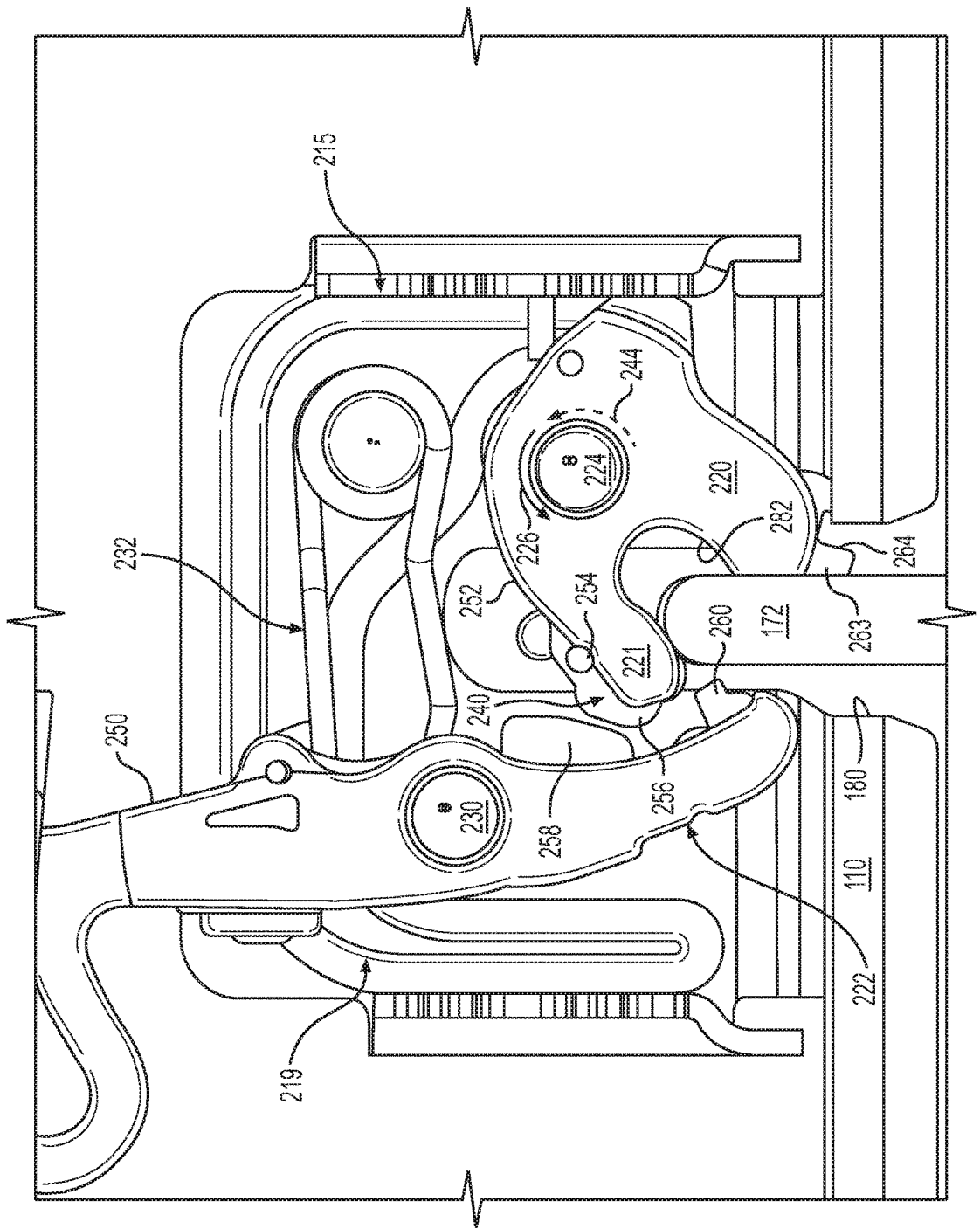
Figure 23A:
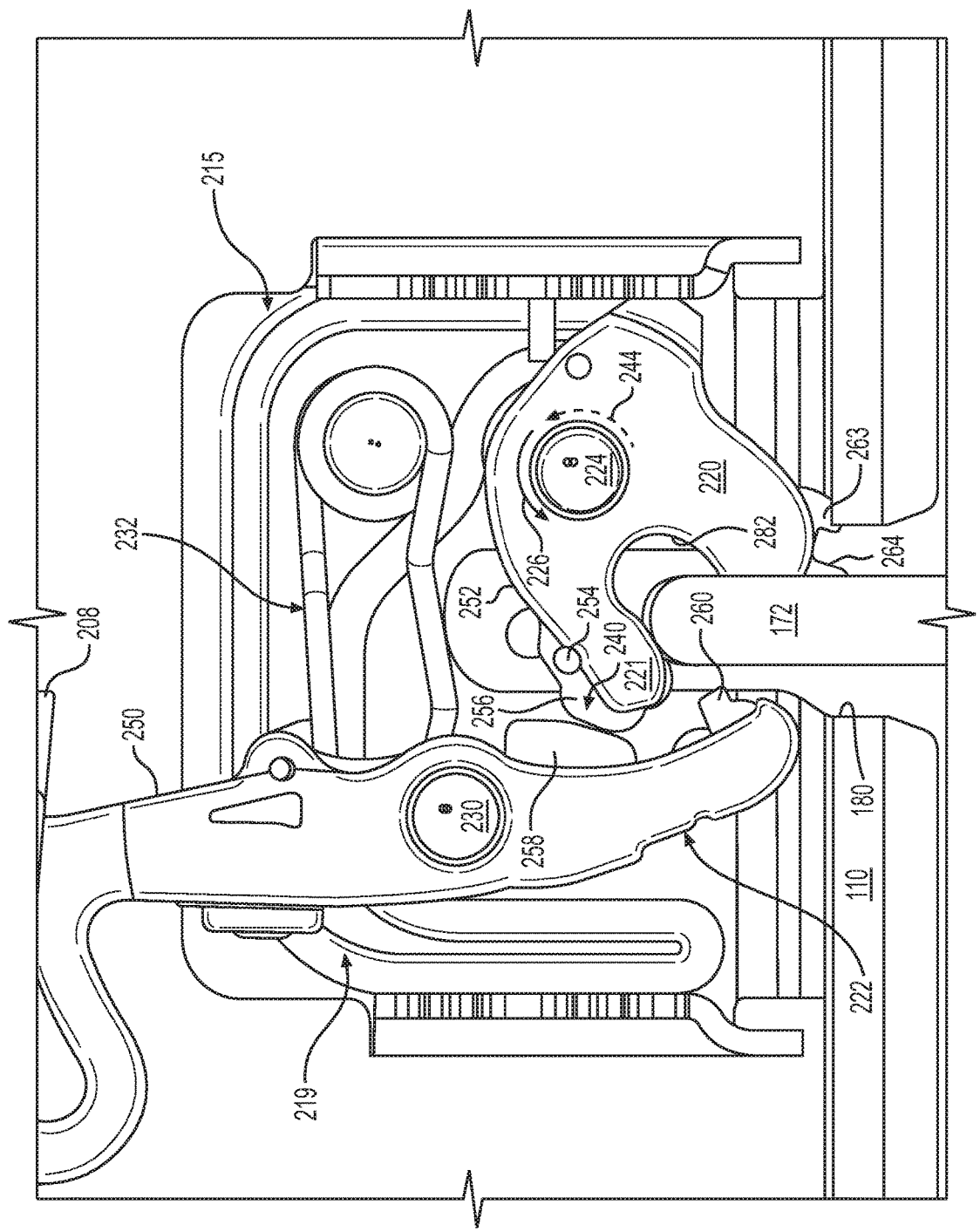
Figure 23B:
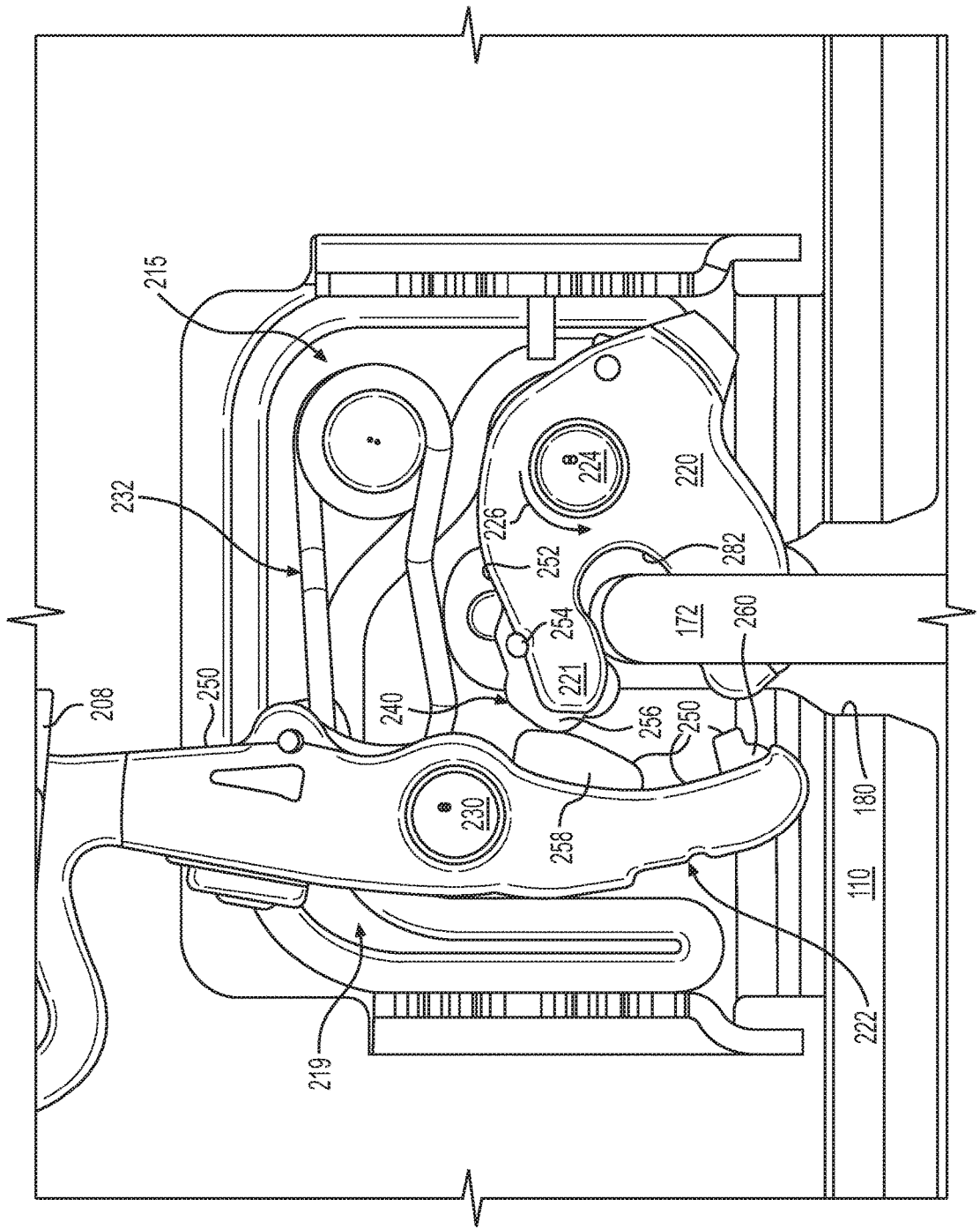
Figure 24:
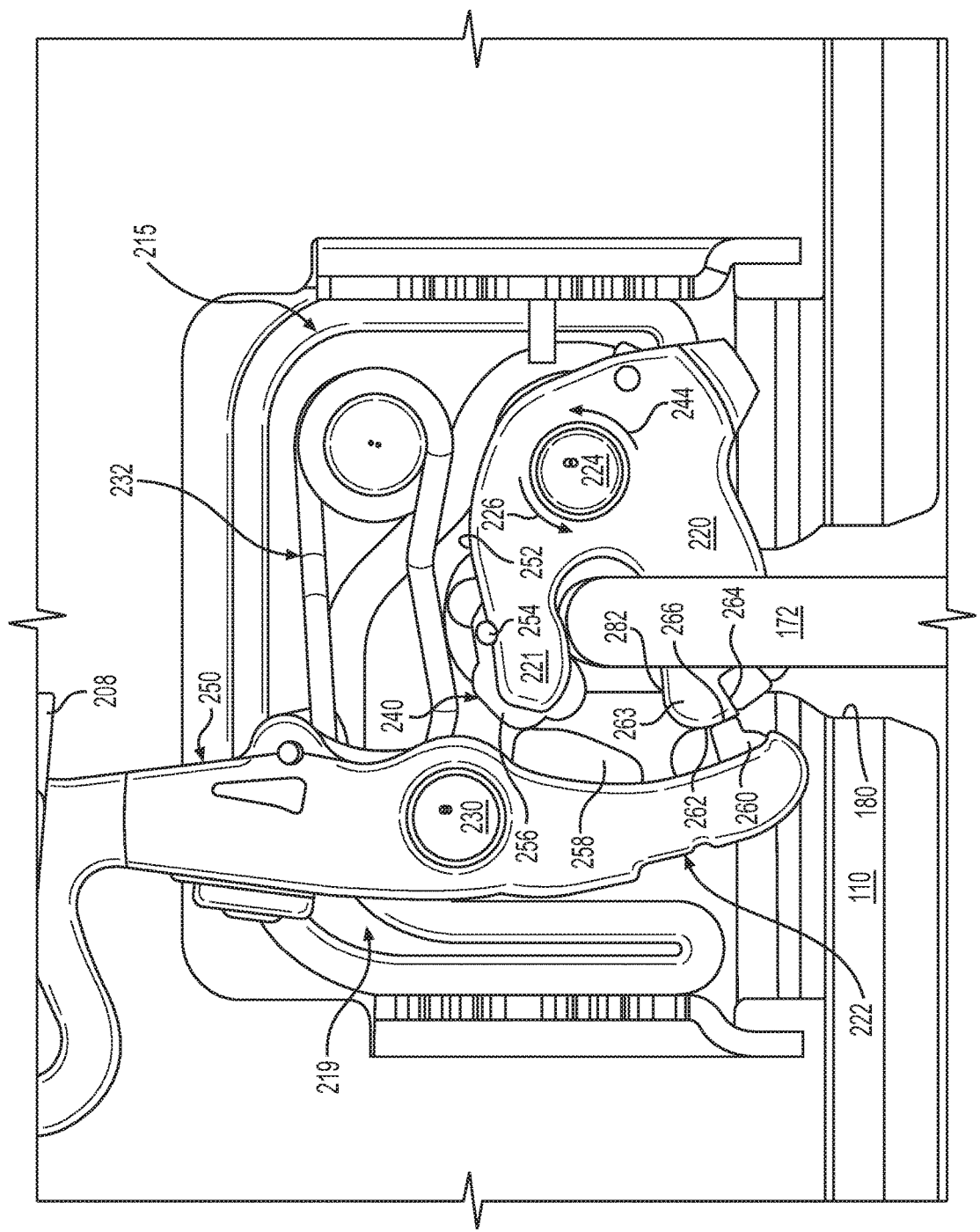
Figure 25:
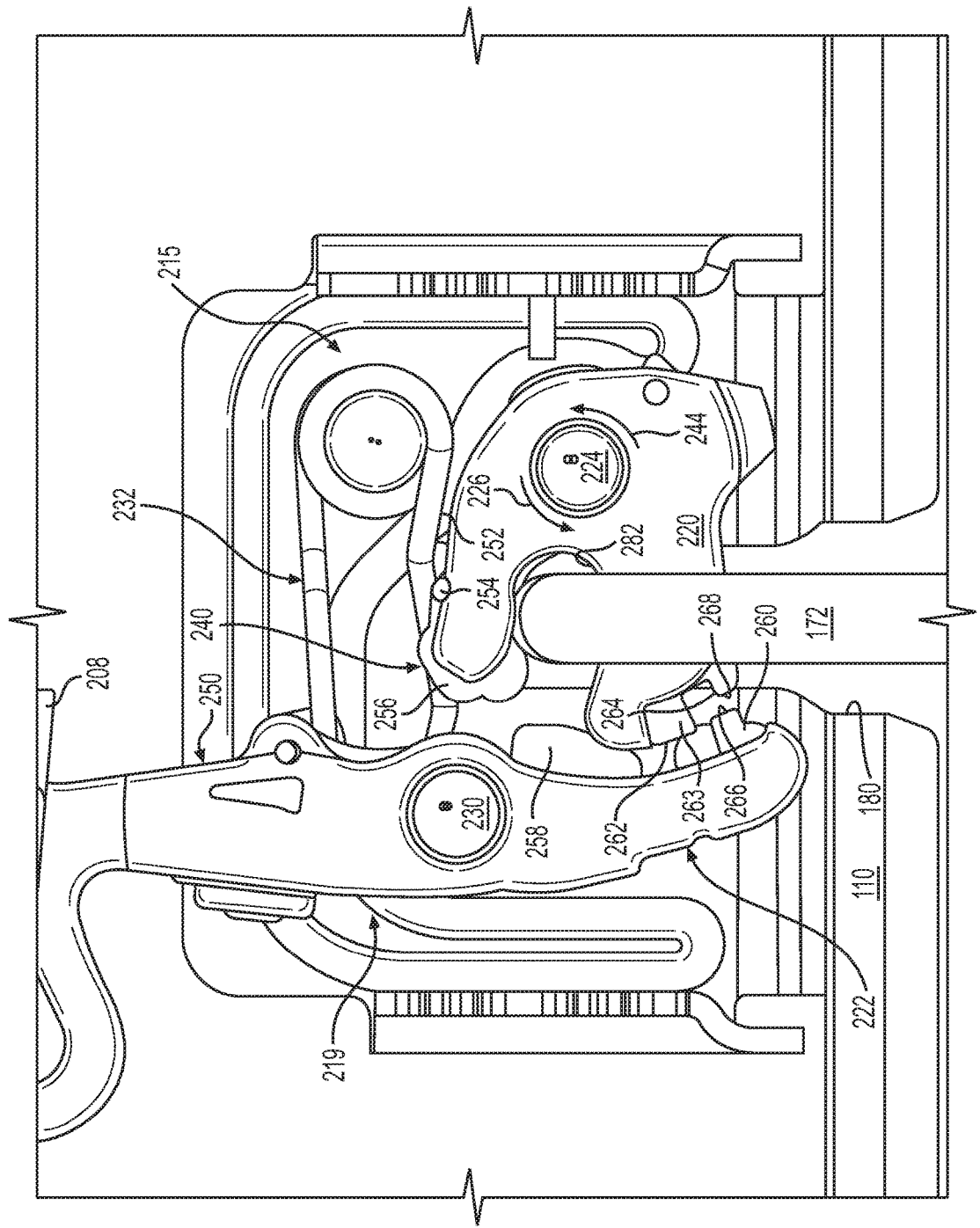
Figure 26:
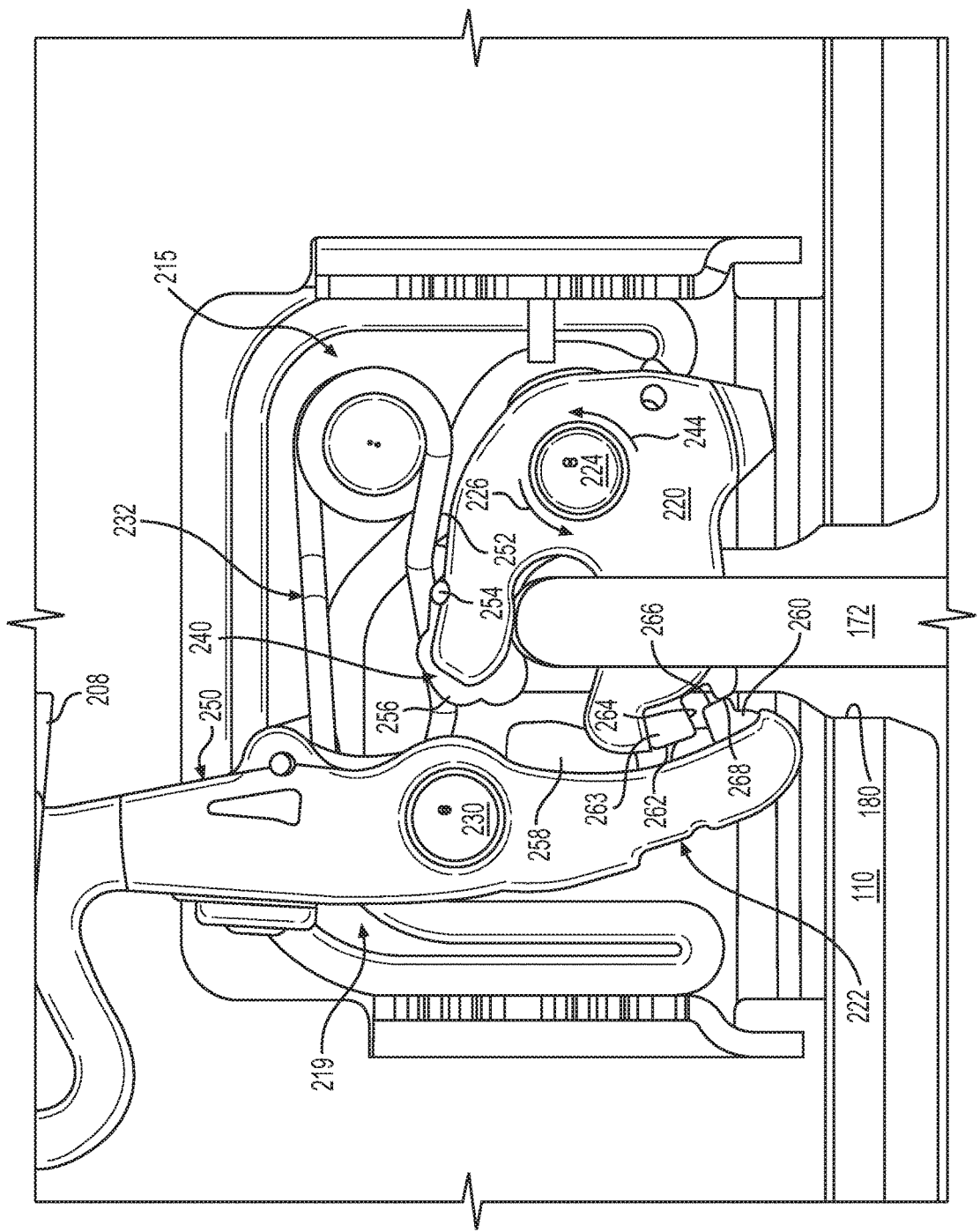
Figure 27:
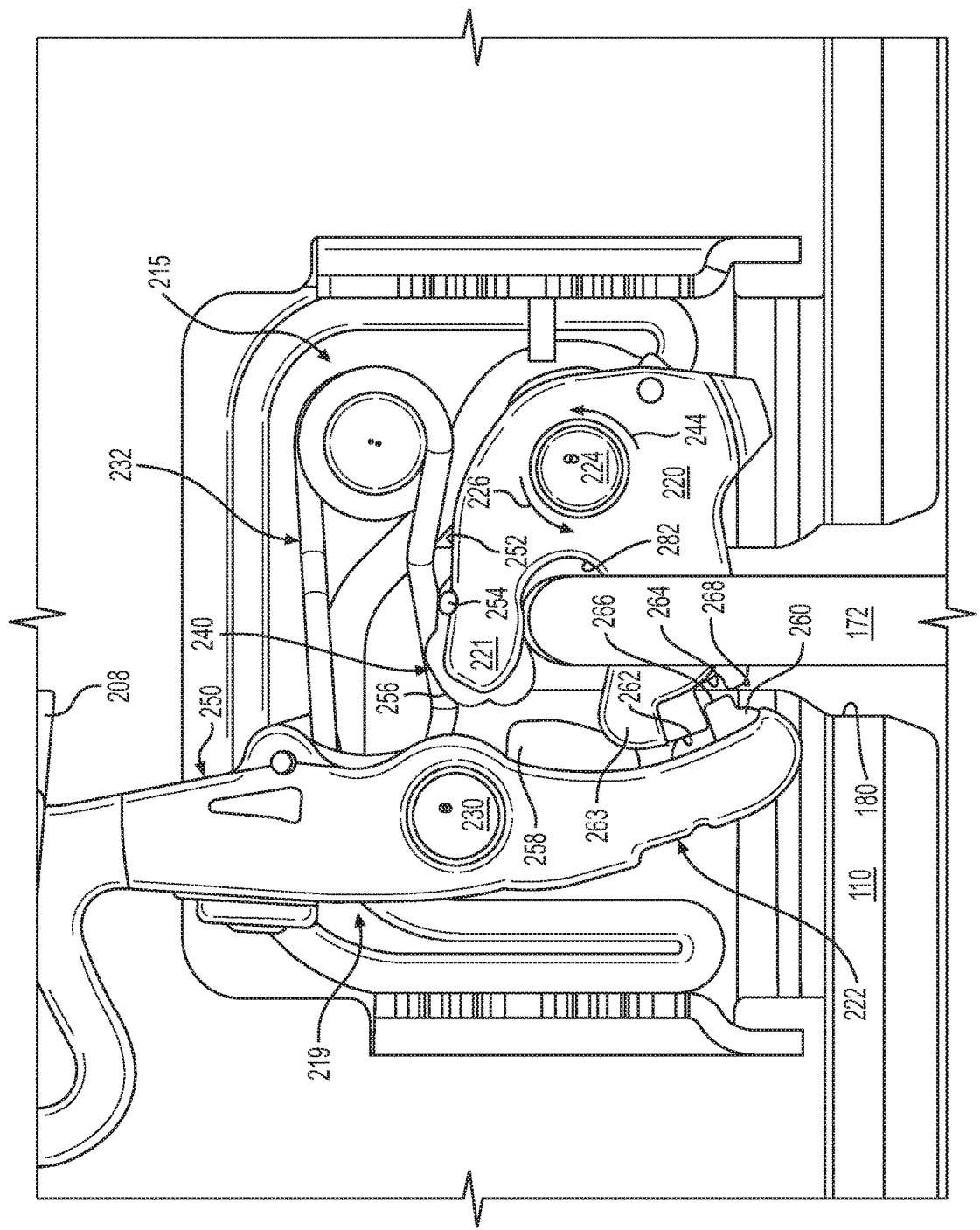
Figure 28:
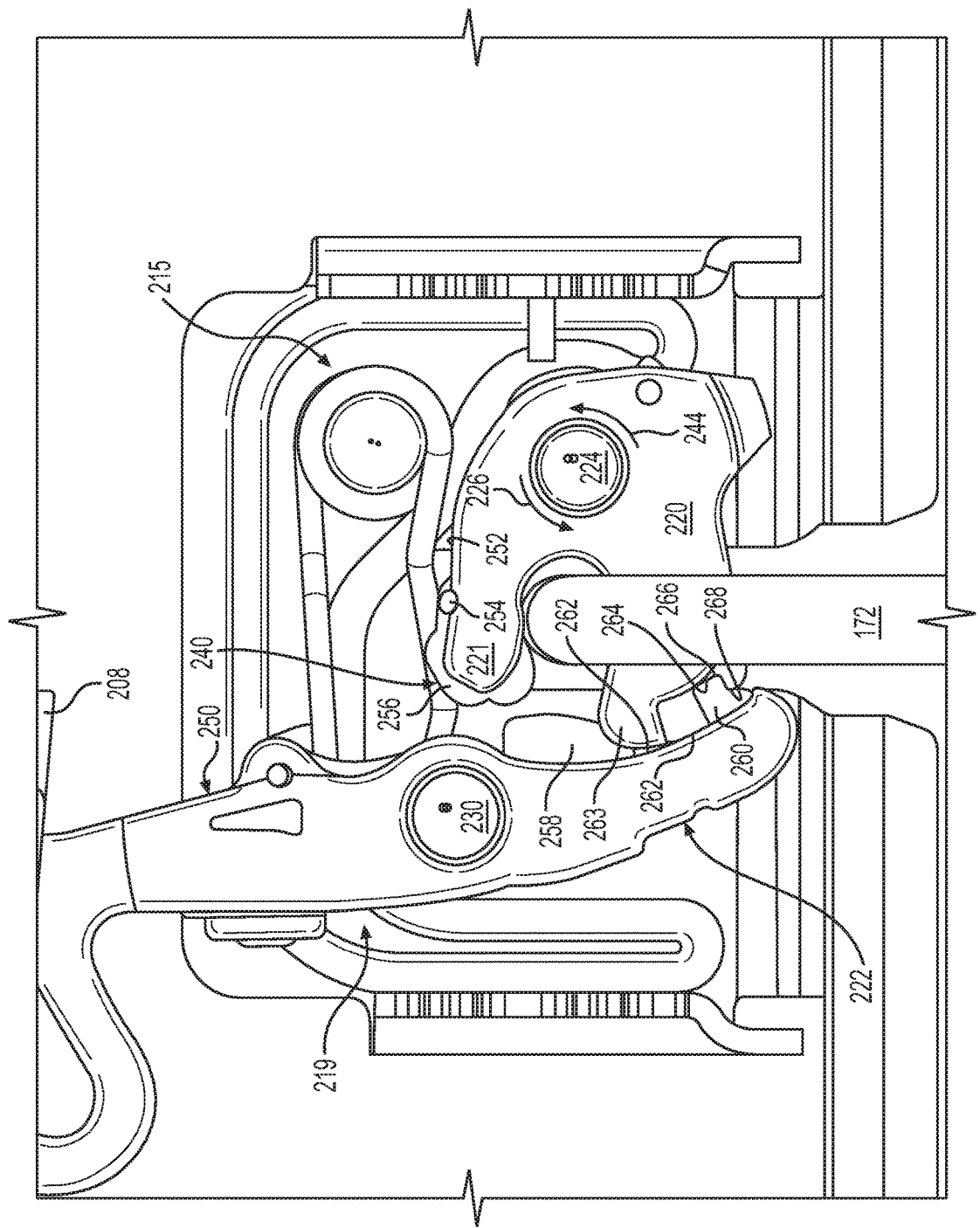
Figure 29:
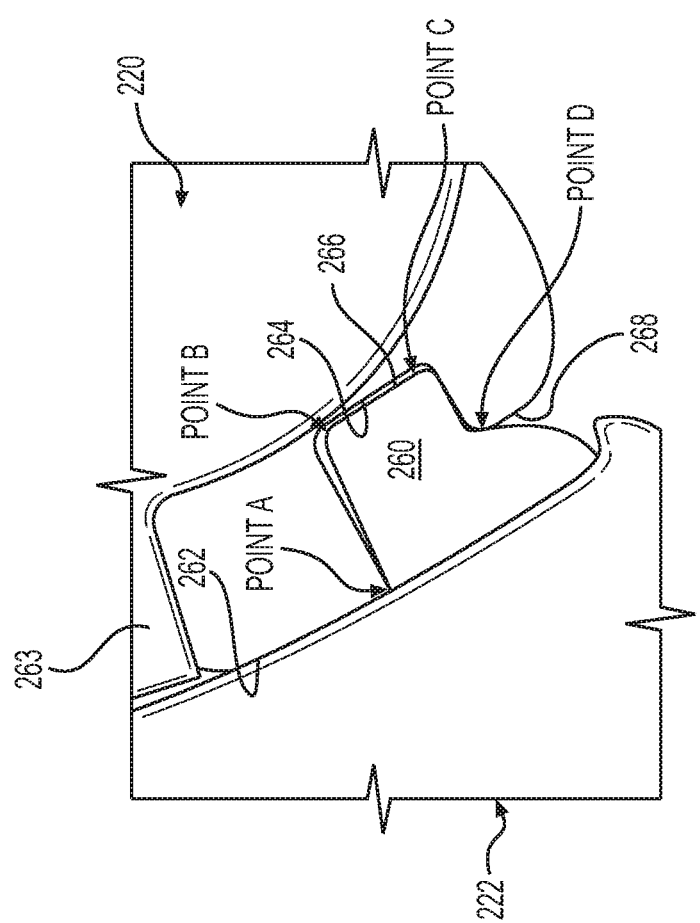

FIG. 20 is the first in a series of segmented plan views of a latch mechanism constructed according to another alternative embodiment of the present disclosure and which is configured for use with a closure latch assembly to provide an anti-chuck locking feature, and wherein the latch mechanism is shown in a released mode with a ratchet located in a striker release position, a pawl located in a ratchet holding position, and an anti-rattle lever located in a released position;

FIG. 21 is the second plan view of the latch mechanism shown in FIG. 20 when a striker engages the ratchet in response to the door being moved toward a closed position;

FIG. 22 is the third plan view of the latch mechanism shown in FIGS. 20 and 21 illustrating rotation of the ratchet in a ratchet closing position from its striker release position toward a primary striker capture position for causing movement of the anti-rattle lever from its released position toward an engaged position;

FIGS. 23A and 23B are fourth and fifth plan views of the latch mechanism shown in FIGS. 20-22 illustrating that continued movement of the anti-rattle lever toward its engaged position results in movement of the pawl from its ratchet holding position toward a ratchet releasing position;

FIG. 24 is the sixth plan view of the latch mechanism shown in FIGS. 20-23 illustrating disengagement of the anti-rattle lever from the pawl for permitting movement of the pawl back toward its ratchet holding position so as to move a lock tooth formed on the pawl into engagement with a first cam formed on the ratchet;

FIG. 25 is the seventh plan view of the latch mechanism shown in FIGS. 20-24 illustrating initial alignment of the lock tooth on the pawl with a lock notch formed in the ratchet when the ratchet is located in its striker over-travel position upon full closure of the door;

FIG. 26 is the eighth plan view of the latch mechanism shown in FIGS. 20-25 illustrating initial engagement of the lock tooth with a second cam formed adjacent to the lock notch for causing rotation of the ratchet in a ratchet releasing direction from its striker over-travel position into its primary striker capture position;

FIG. 27 is the ninth plan view of the latch mechanism shown in FIGS. 20-26 illustrating initial entry of the lock tooth into the lock notch;

FIG. 28 is the tenth plan view of the latch mechanism shown in FIGS. 20-27 illustrating the lock tooth on the pawl completely disposed within the lock notch on the ratchet for placing the latch mechanism in a latched mode and providing the anti-chucking feature; and FIG. 29 is an enlarged partial view of FIG. 28 better illustrating the engaged relationship between the lock tooth on the pawl and the lock notch on the ratchet to provide the self-locking ratchet feature.

Corresponding reference numerals indicate corresponding parts throughout the several views of the drawings.

DETAILED DESCRIPTION

Example embodiments of a latch assembly configured to include a latch mechanism providing an anti-chuck locking feature will now be more fully described with reference to the accompanying drawings. The latch assembly of the present disclosure can be part of a closure latching system (i.e. passenger doors, trunk lids, tailgates, liftgates, etc.) or, in the alternative, be part of a seat latching system (i.e. sliding passenger seats, bucket seats, bench seats, etc.). However, the inventive concepts embodied in the present disclosure are shown only in association with closure latching systems for purposes of clarity and brevity.

The example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated degrees or at other orientations) and the spatially relative descriptions used herein interpreted accordingly.

Figure 1:
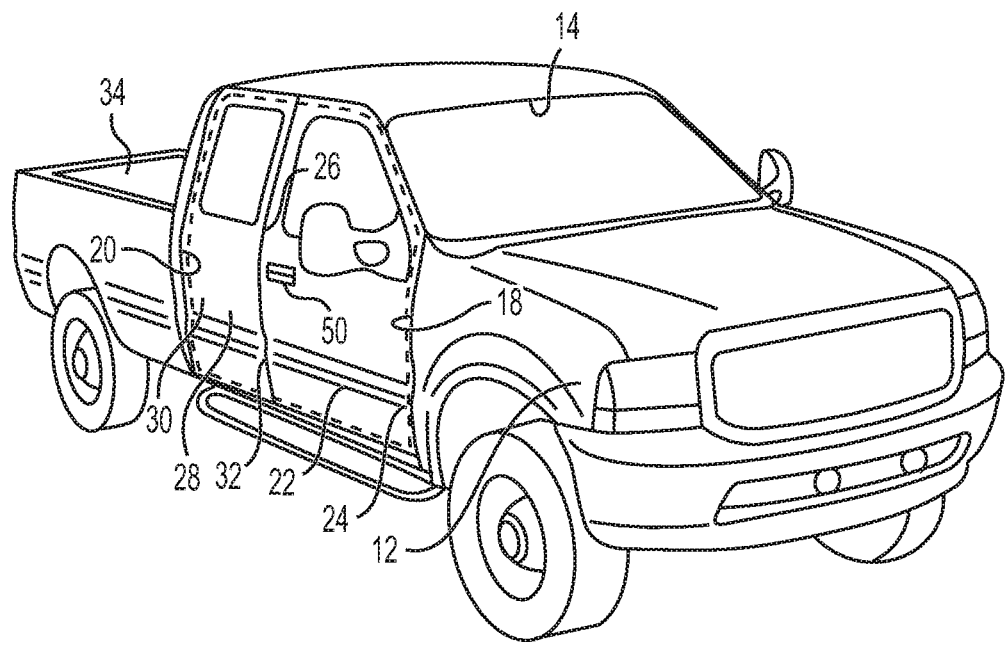
FIG. 1 is a isometric view of a motor vehicle equipped with a dual-door, pillar-less closure system.
Figure 2:
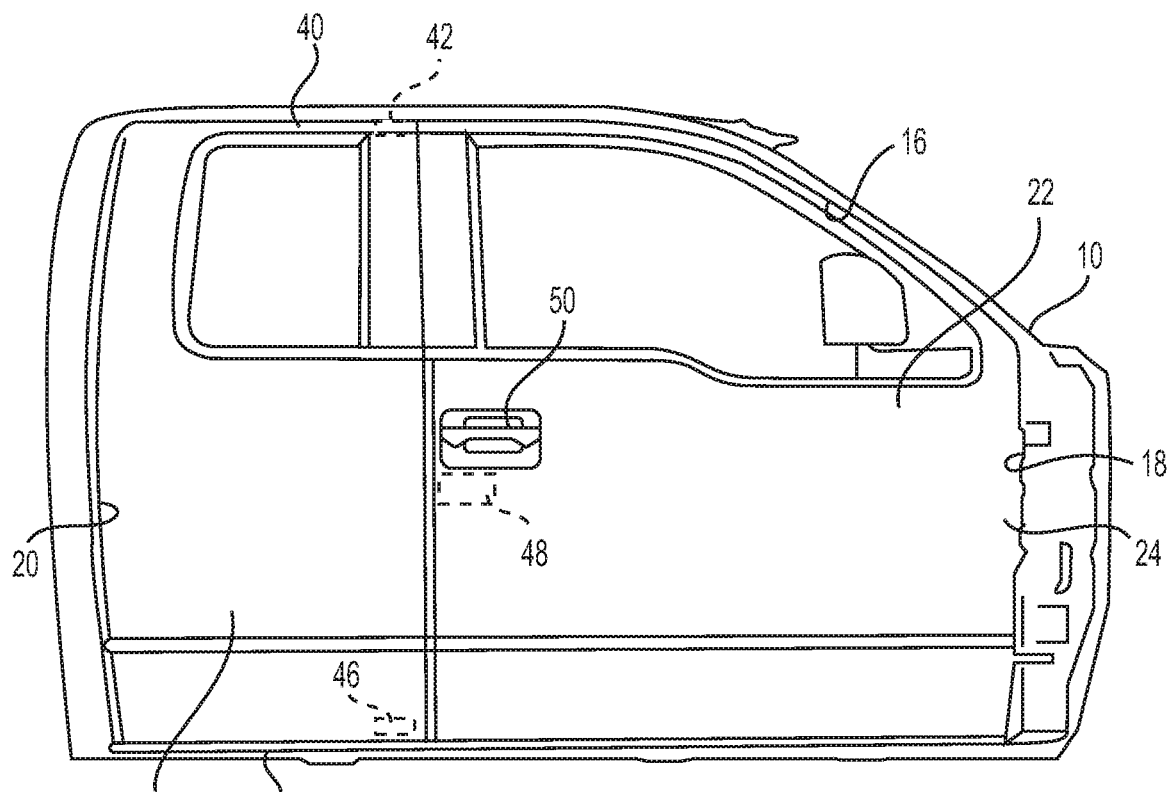
FIG. 2 is a side view of the motor vehicle shown in FIG. 1 with the doors in a closed position.
Figure 3:
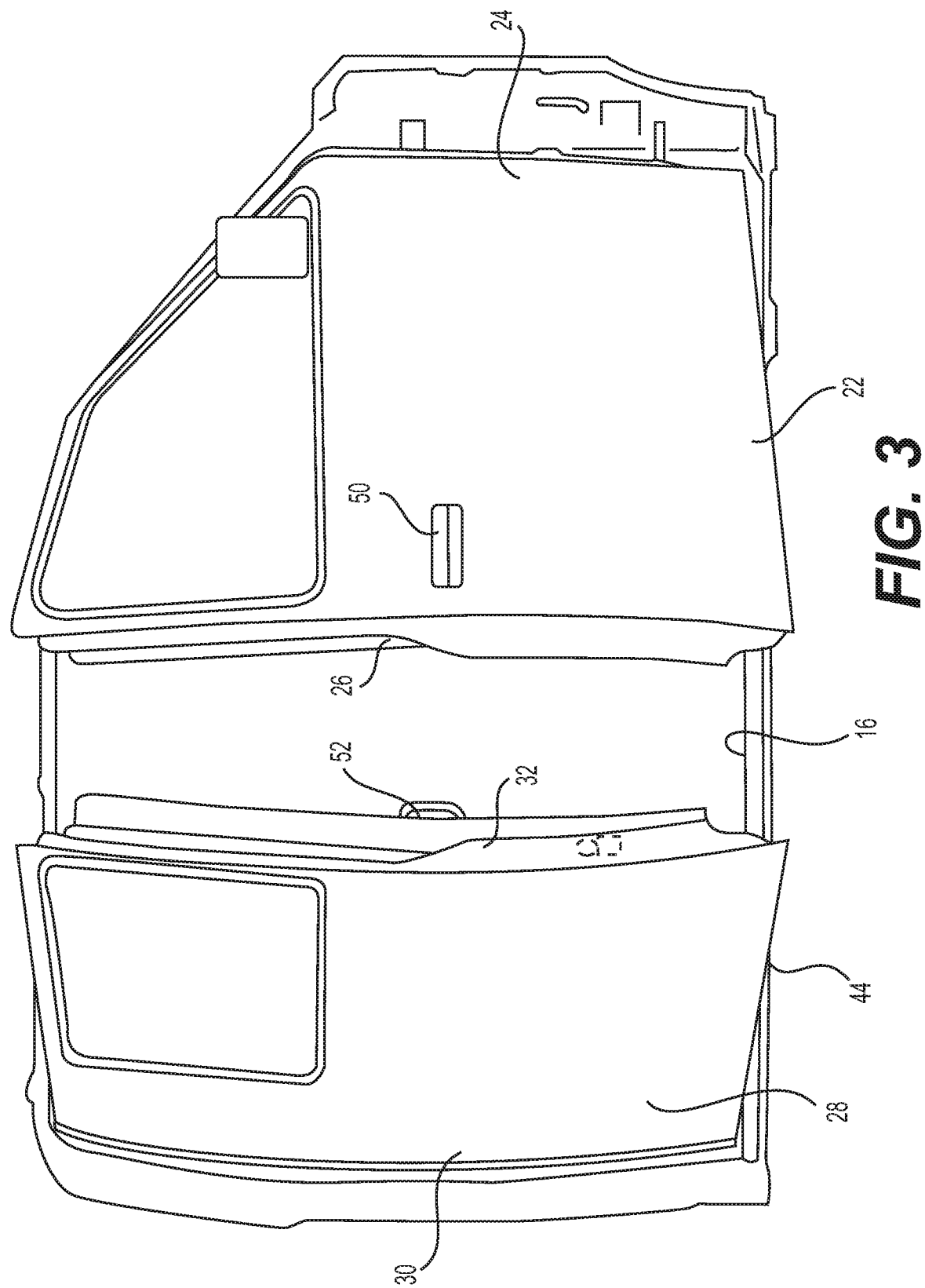
FIG. 3 is another side view of the motor vehicle shown in FIG. 1 with the doors in a partially open position.

Referring initially to FIGS. 1-3, a motor vehicle is shown configured as a pickup truck including a vehicle body 10 with a truck bed 34 and having an exterior 12 and an interior 14 defining a passenger compartment. Connecting exterior 12 and interior 14 of vehicle body 10 is a continuous or "pillar-less" side door opening 16 defining a first or front terminal end 18 and a second or rear terminal end 20. Providing a first moveable closure member for a front portion of door opening 16 is a first or front door 22 having a forward portion 24 pivotably connected via front hinges (not shown) to vehicle body 10 adjacent to front terminal end 18 of door opening 16. Front door 22 has a rearward portion 26 generally opposite its pivotal connection to vehicle body 10. Providing a second moveable closure member for a rear portion of door opening 16 is a second or rear door 28. Rear door 28 has a rearward portion 30 which is pivotably connected via rear hinges (not shown) to vehicle body 10 adjacent to rear terminal end 20 of door opening 16 and has a forward portion 32 generally opposite to its pivotal connection. When doors 22, 28 are closed, the extreme end of rearward portion 26 of front door 22 overlaps and is latched to the extreme end or forward portion 32 of rear door 28.

Rear door 28 is schematically shown (FIG. 2) along its upper edge 40 to have a releasable latch connection via a first closure latch assembly 42 with body 10 at a location between front and rear ends 18 and 20 of door opening 16. Rear door 28 is also schematically shown along a bottom edge 44 to have a releasable latch connection via a second closure latch assembly 46 with vehicle body 10 at a location between front and rear ends 18 and 20 of opening 16. When closed, front door 22 has a releasable latch connection via a third closure latch assembly 48 with rear door 28. Third closure latch assembly 48 is shifted from a latched mode into an unlatched mode via actuation of a latch release mechanism. The latch release mechanism may be manually-operated via actuation of front door handle 50 or power-operated to facilitate the release of latch assembly 48. A release handle 52 is provided on an interior wall along edge portion 32 of rear door 28 and can be actuated, with front door 22 open, to concurrently shift first and second closure latch assemblies 42, 46 from their latched mode into their unlatched mode so as to permit rear door 28 to pivot outwardly toward its open position. Those skilled in the art will recognize that the location of closure latch assemblies 42, 46 and 48 shown is merely intended to illustrate one exemplary dual-door latching arrangement and is not intended to limit the present disclosure. Likewise, the type of release systems employed is not relevant to the inventive concepts associated with the present disclosure. The present disclosure is not limited to dual-door system with the closure latch assemblies to be disclosed hereinafter adapted for use with virtually any type of vehicular closure member (i.e., side doors, tailgates, liftgates, hatchbacks, etc).

Figure 4:
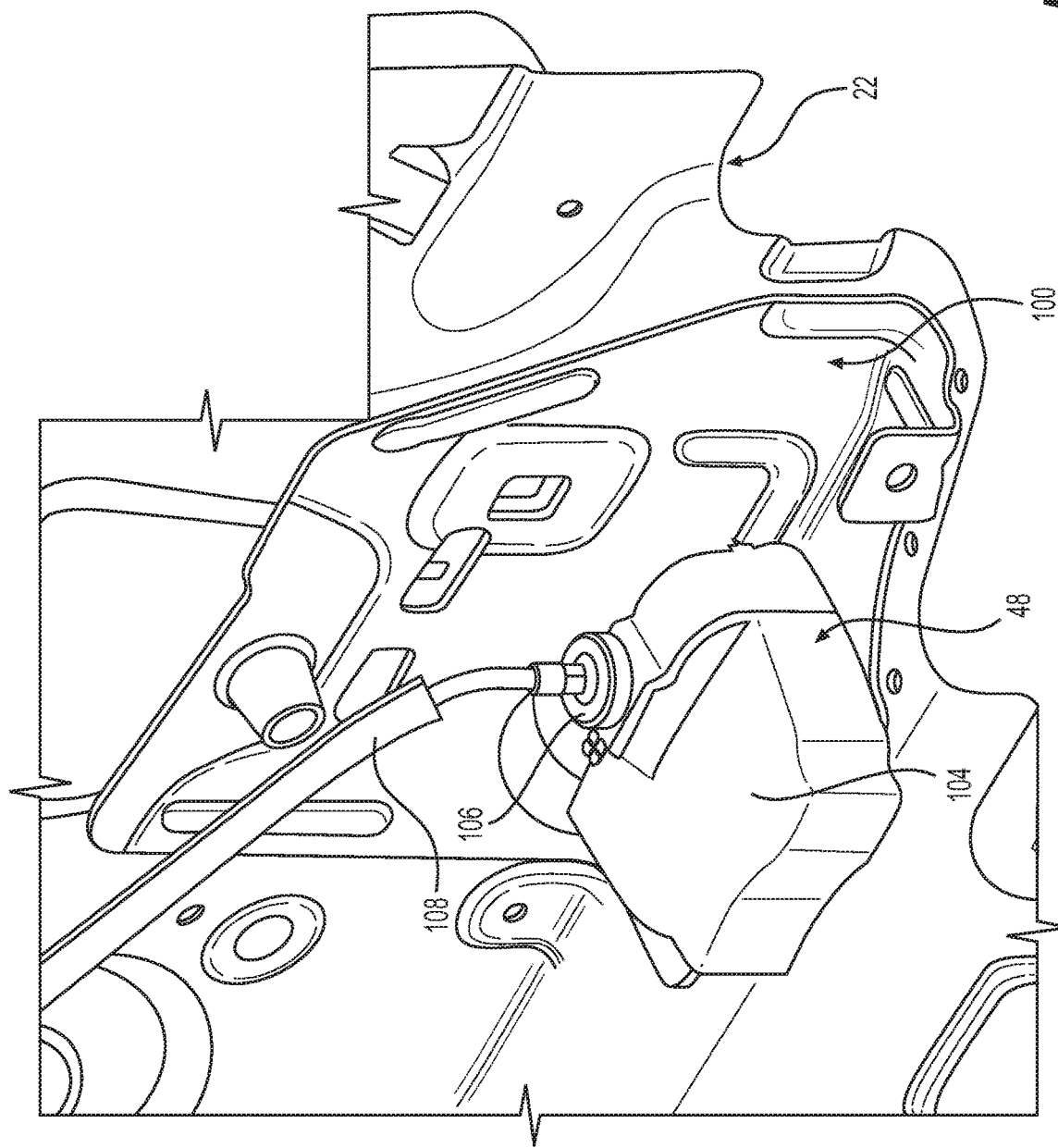
FIG. 4 is an isometric view of a closure latch assembly for use with the doors of the closure system and which provide an anti-chucking function.
Figure 5B:
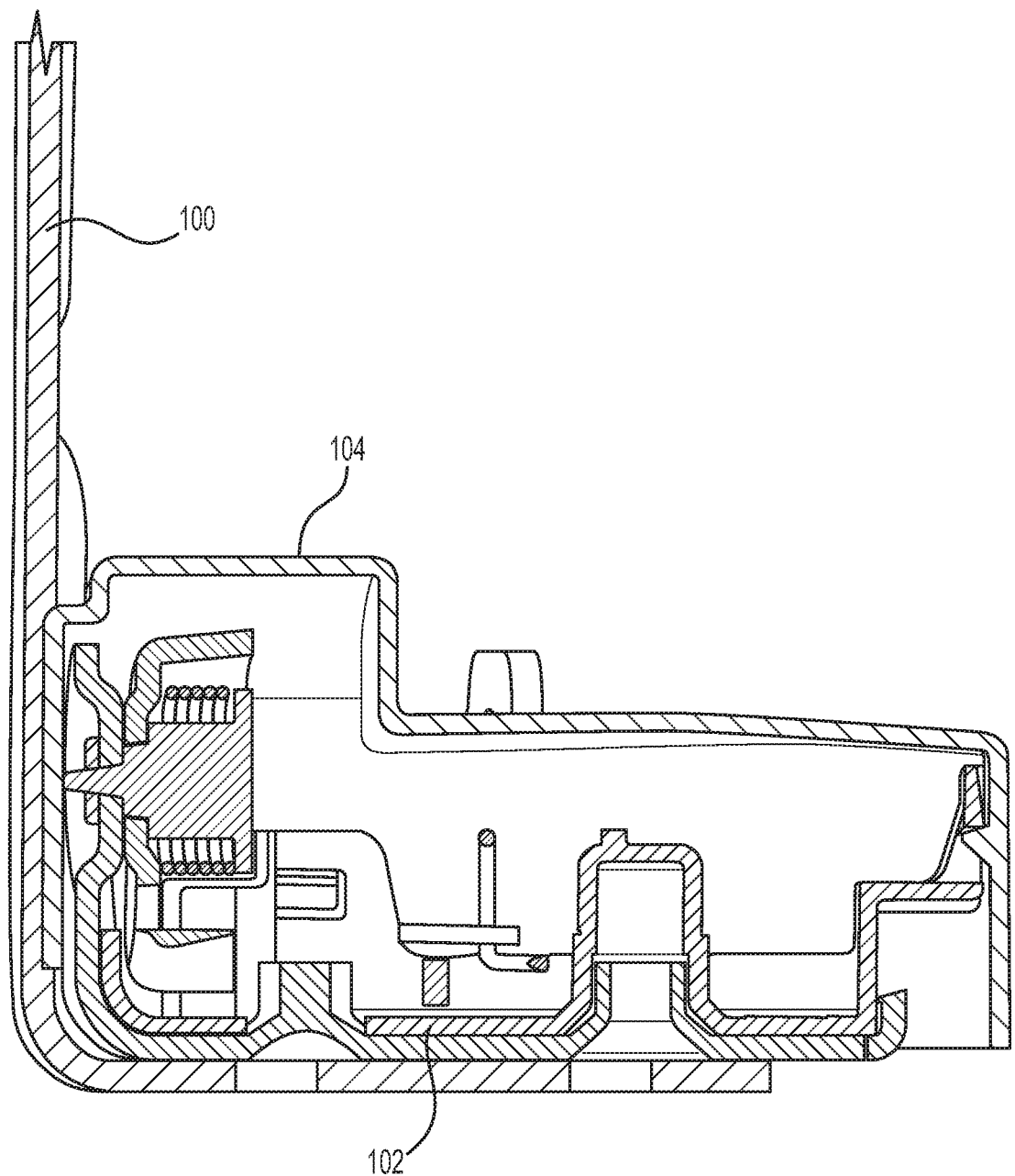
Figure 6:
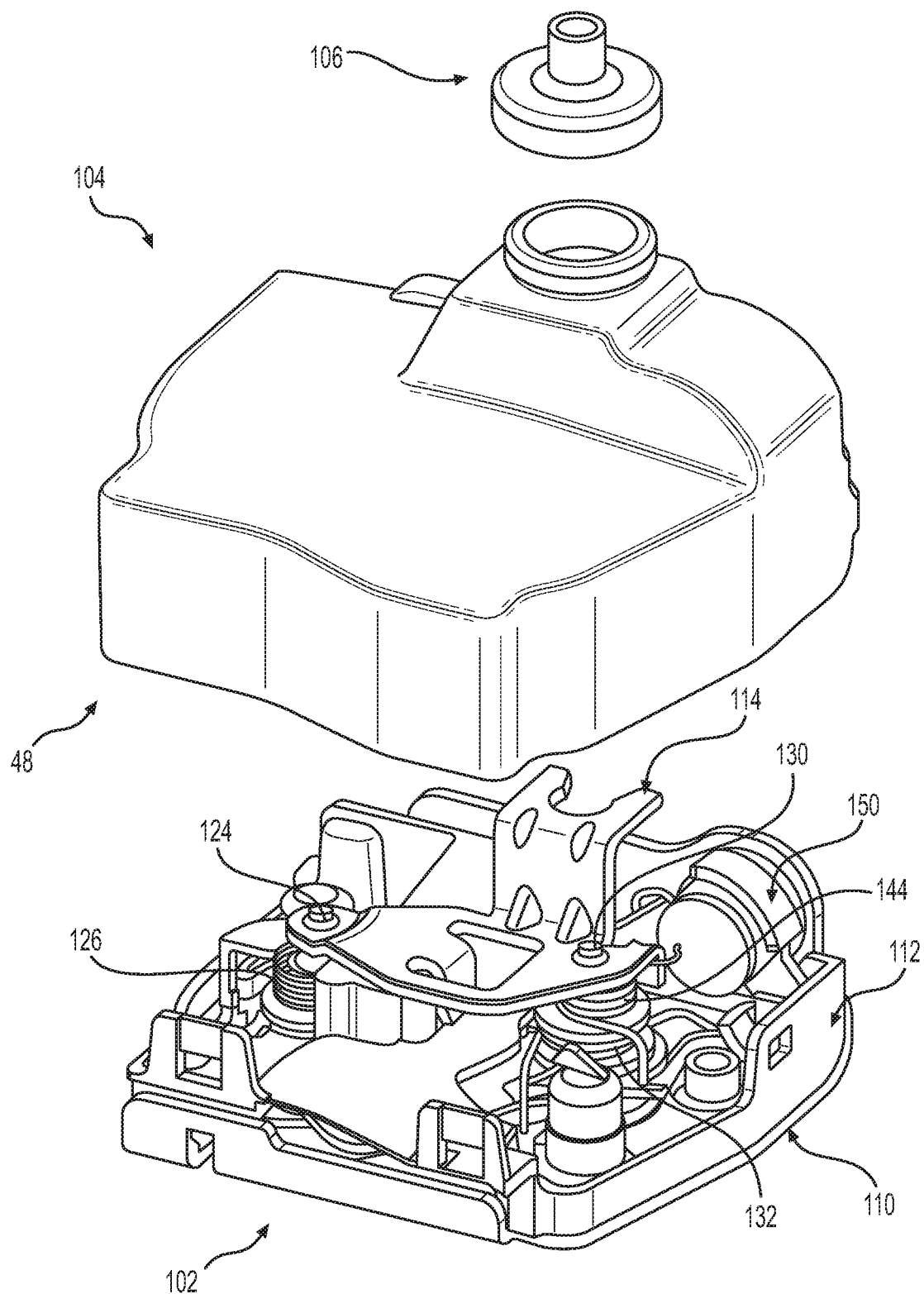
FIG. 6 is an exploded isometric view of the closure latch assembly illustrating a latch module, a latch cover, and a seal grommet associated therewith.

Referring now to FIGS. 4-17, a first non-limiting embodiment of a latch assembly will be described to clearly indicate integration of an anti-chucking feature into a latch mechanism for the purpose of eliminating door rattle or "chucking" noise between doors 22, 28 while the vehicle is being driven. It is to be understood that the closure latch assembly hereinafter described can be used with either rear door 28 and/or front door 22. FIG. 4 illustrates the closure latch assembly as third closure latch assembly 48 mounted to a reinforcement plate 100, which, in turn, is mounted to a portion of front door 22. As shown in FIG. 6, closure latch assembly 48 generally includes a strength module 102, a latch cover 104, and a seal grommet 106 through which one end of a release cable 108 extends. Release cable 108 has its opposite end connected to handle 50.

Figure 7:
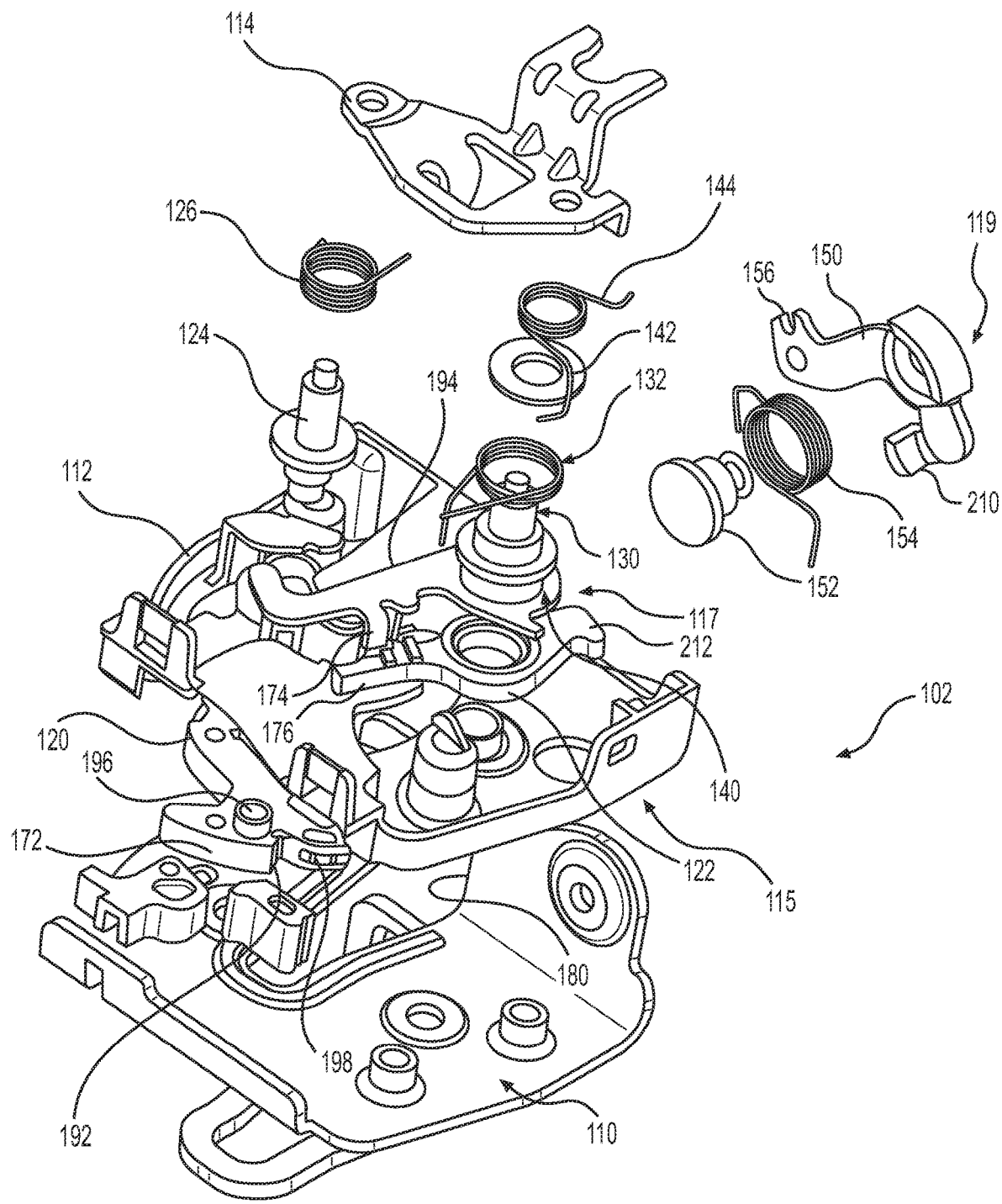
FIG. 7 is an exploded isometric view of the latch module shown in FIG. 6.
Figure 8:
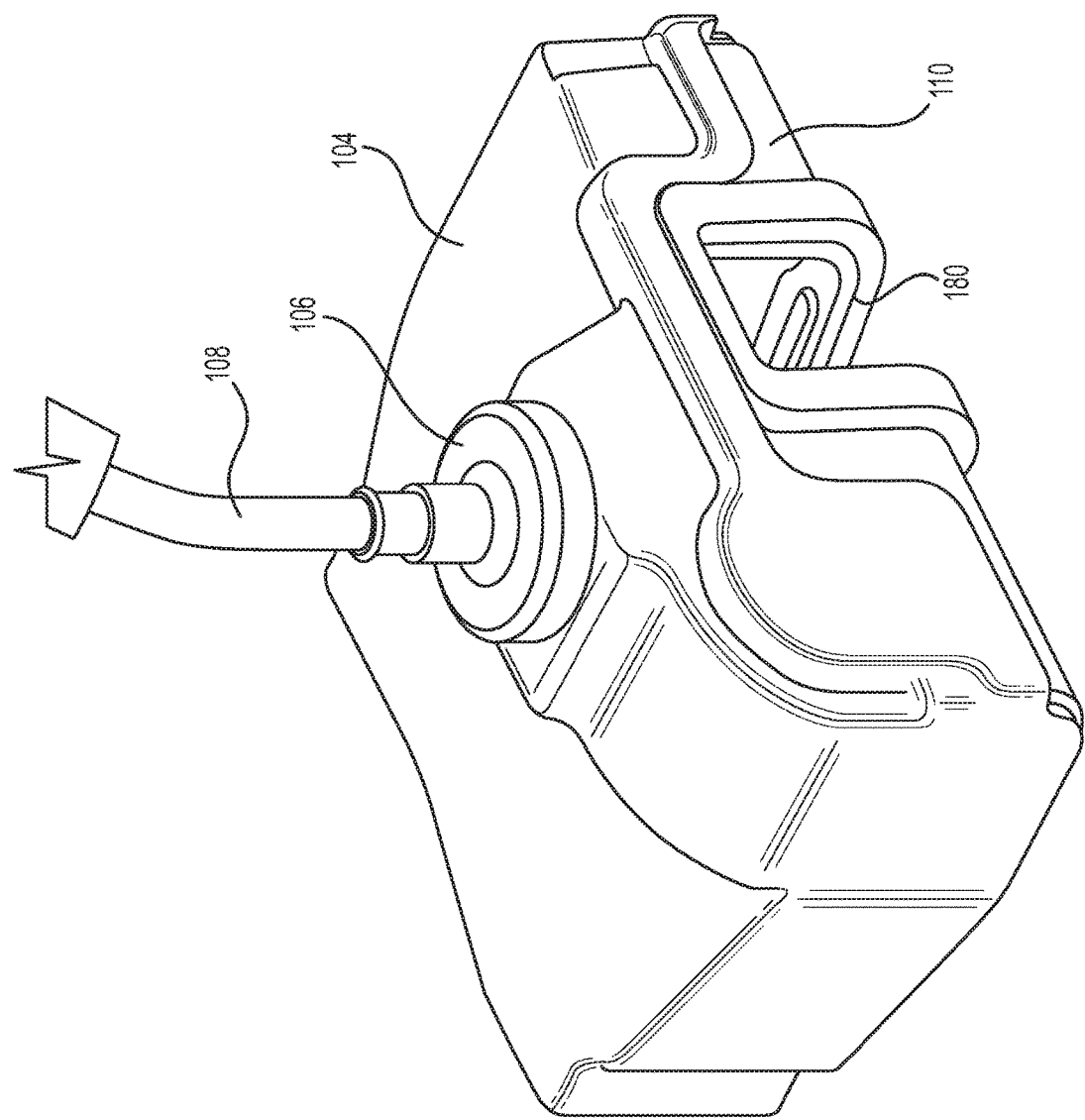
FIG. 8 is an assembled isometric view of the closure latch assembly.
Figure 9:
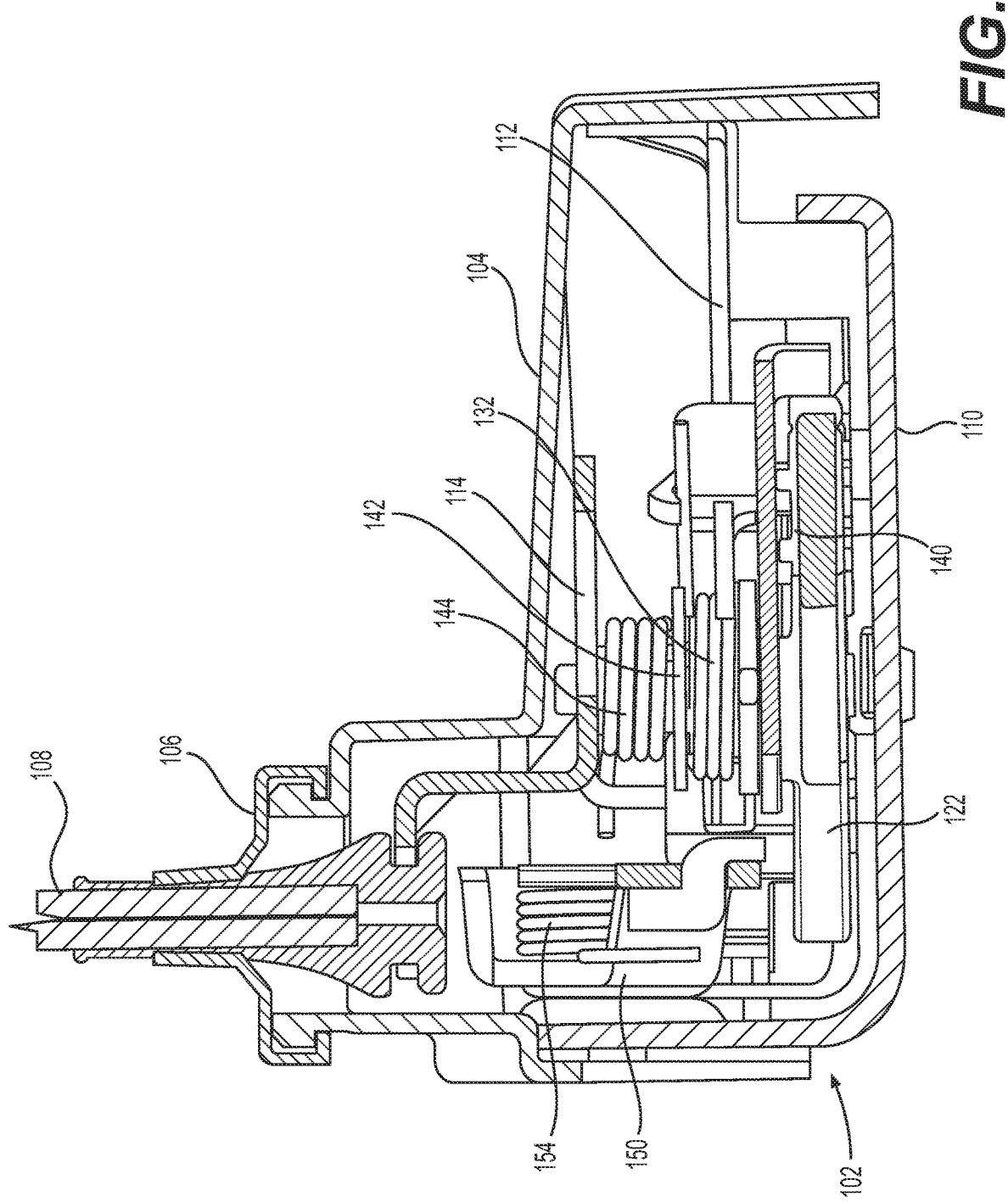
FIG. 9 is a sectional view of the closure latch assembly shown in FIG. 8.

FIG. 7 illustrates an exploded view of strength module 102 to better identify each of its associated components. Strength module 102 generally includes a housing and support structure comprised of a frame plate 110, an intermediate housing 112, and a backplate 114. Disposed between frame plate 110 and housing 112 is a latch mechanism 115, an anti-chucking mechanism 117, and a latch release mechanism 119. Latch mechanism 115 includes a ratchet 120 and a pawl 122. Ratchet 120 is supported on frame plate 110 via a ratchet rivet 124 for movement between a striker release position, a secondary striker capture position, a primary striker capture position, and a striker over-travel position. Ratchet 120 is normally biased toward its striker release position via a ratchet spring 126. Pawl 122 is supported on frame plate 110 via a pawl rivet 130 for movement between a ratchet holding position and a ratchet releasing position relative to ratchet 120. Pawl 122 is normally biased toward its ratchet holding position via a pawl spring 132. Anti-chucking mechanism 117 generally includes an anti-chuck lever 140 supported on pawl rivet 130 for movement between a released position and an engaged position, a washer 142, and an anti-chuck spring 144 operable to normally bias anti-chuck lever 140 toward its engaged position. Latch release mechanism 119 is shown to generally include a release lever 150 supported on frame plate 110 via mounted on a release lever rivet 152 for movement between a non-actuated position and an actuated position, and a release lever spring 154 configured to normally bias release lever 150 toward its non-actuated position. Cable 108 is adapted to be attached between a first leg segment 156 of release lever 150 and door handle 50 so as to permit release lever 150 to be forcibly moved from its non-actuated position to its actuated position in response to actuation of door handle 50.

Figure 10:
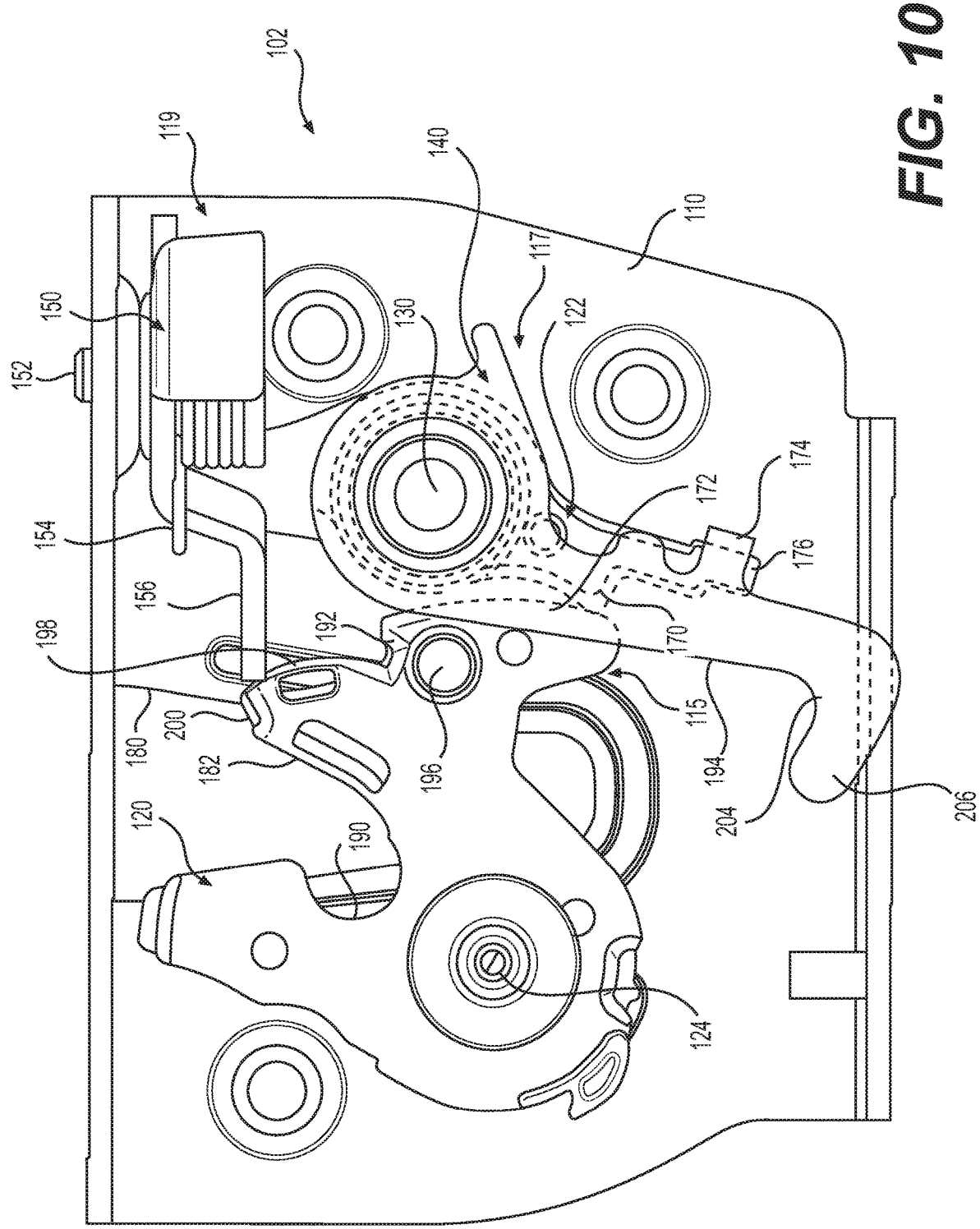
FIG. 10 is the first in a series of sequential plan views of the closure latch assembly showing the operational orientation of a latch mechanism in an unlatched mode and an anti-chucking mechanism in a released mode when the door is open.

FIGS. 10 through 15 provide a series of sequential views illustrating operation of closure latch assembly 48. Referring initially to FIG. 10, latch mechanism 115 is shown in an unlatched mode, anti-chucking mechanism 117 is shown in a released mode, and release mechanism 119 is shown in a non-actuated mode. Specifically, ratchet 120 is shown in its striker release position, pawl 122 is shown held in its ratchet releasing position due to engagement of a pawl lug 170 with a first ratchet cam surface 172, and anti-chuck lever 140 is shown held in its released position due to engagement of a lever lug 174 on lever 140 with an extended leg portion 176 of pawl 122. Thus, FIG. 10 illustrates the arrangement with front door 22 in its open position.

Figure 11:
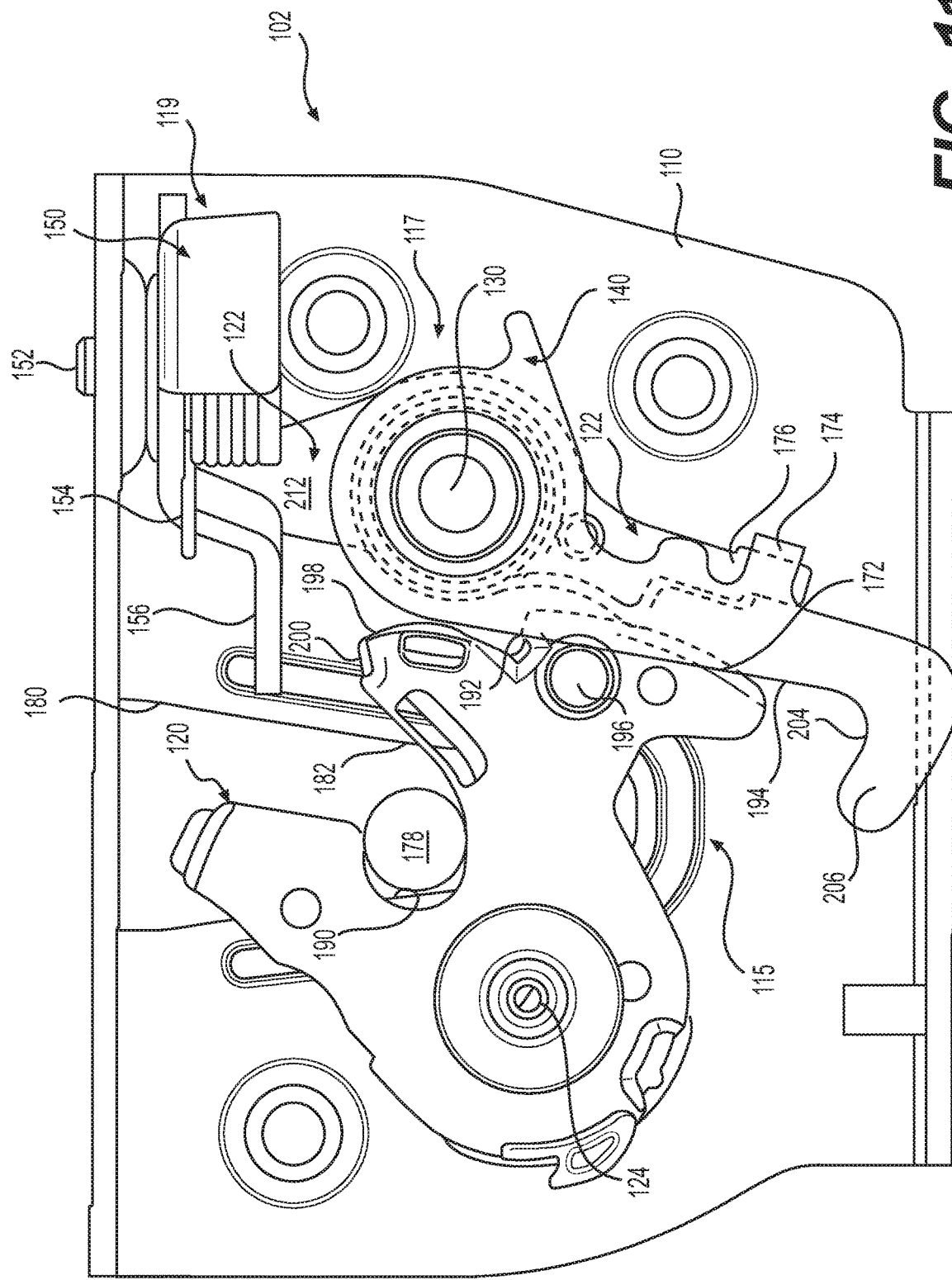
FIG. 11 is the second plan view of the closure latch assembly showing the operational orientation of the latch mechanism and the anti-chucking mechanism when the door is swung toward its closed position and a striker initiates rotation of a ratchet in a ratchet closing direction.

Referring next to FIG. 11, upon movement of door 22 from its open position toward its closed position, a striker 178 on rear door 28 enters a fishmouth segment 180 of frame plate 110 and engages a guide channel 182 formed in ratchet 120, thereby forcibly pivoting ratchet 120 in a closing (i.e. clockwise) direction from its striker release position toward its primary striker capture position. Such action causes pawl lug 170 to continue to ride along ratchet cam 172 and continue to hold pawl 122 in its ratchet releasing position. As noted, when pawl 122 is held in its ratchet releasing position, anti-chuck lever 140 is retained in its released position via continued engagement of its lever lug 174 with leg segment 176 of pawl 122.

Figure 12:
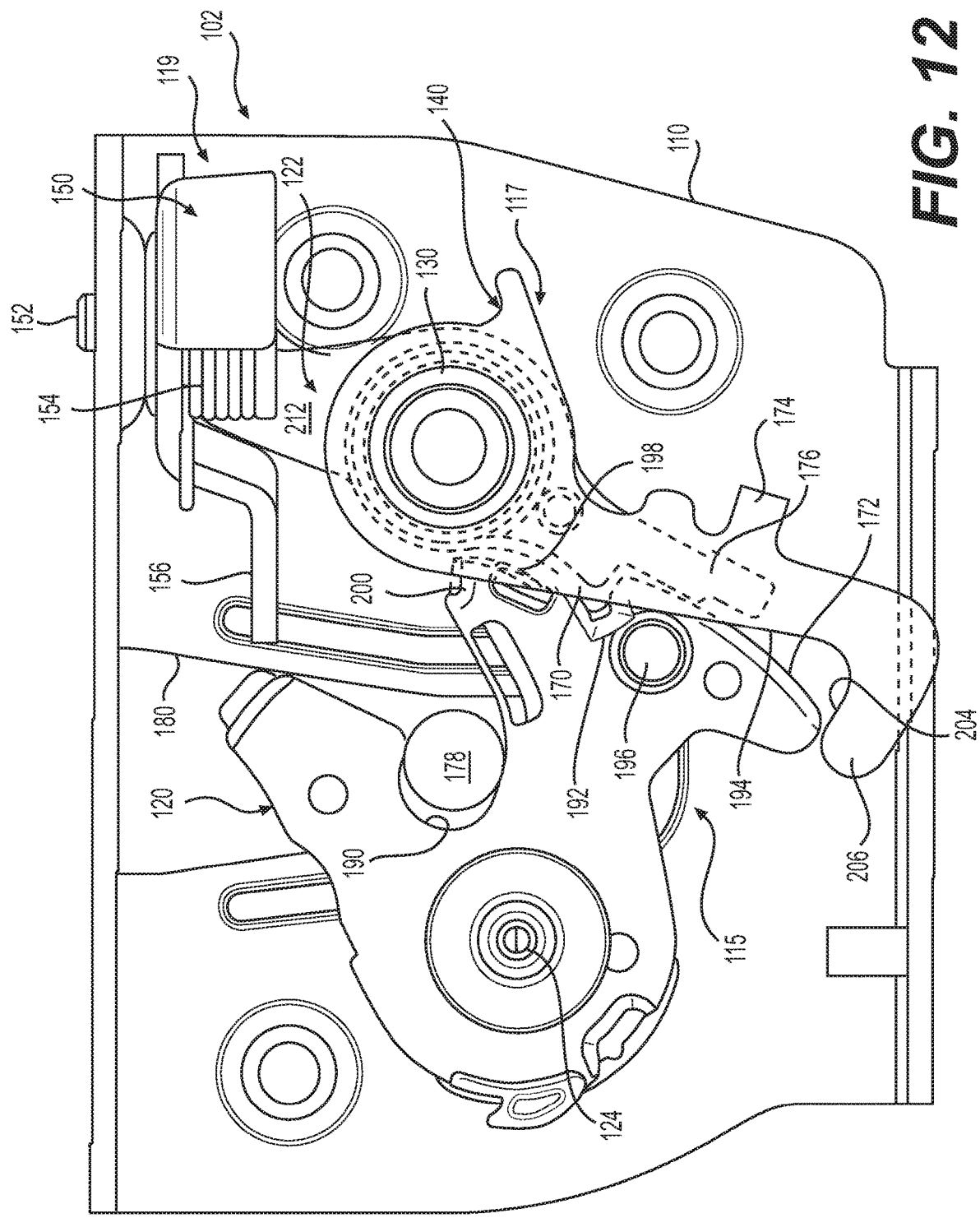
FIG. 12 is the third plan view of the closure latch assembly showing the ratchet now held in a secondary latched position by a pawl to place the latch mechanism in a secondary latched mode while the anti-chucking mechanism is maintained in its released mode.

Referring next to FIG. 12, continued rotation of ratchet 120 in the ratchet closing direction has now resulted in striker 178 entering a striker retention seat 190 formed in guide channel 182 and pawl lug 170 engaging a secondary latch shoulder 192 formed on ratchet 120, whereby ratchet 120 is held in its secondary latched position by pawl 122 being located in its ratchet holding position. Upon movement of pawl 122 to its ratchet holding position, anti-chucking lever 140 is urged by spring 144 in an engaging (i.e. clockwise) direction to move from its released position toward its engaged position until its edge segment 194 engages a stop post 196 extending outwardly from ratchet 120.

Figure 13:
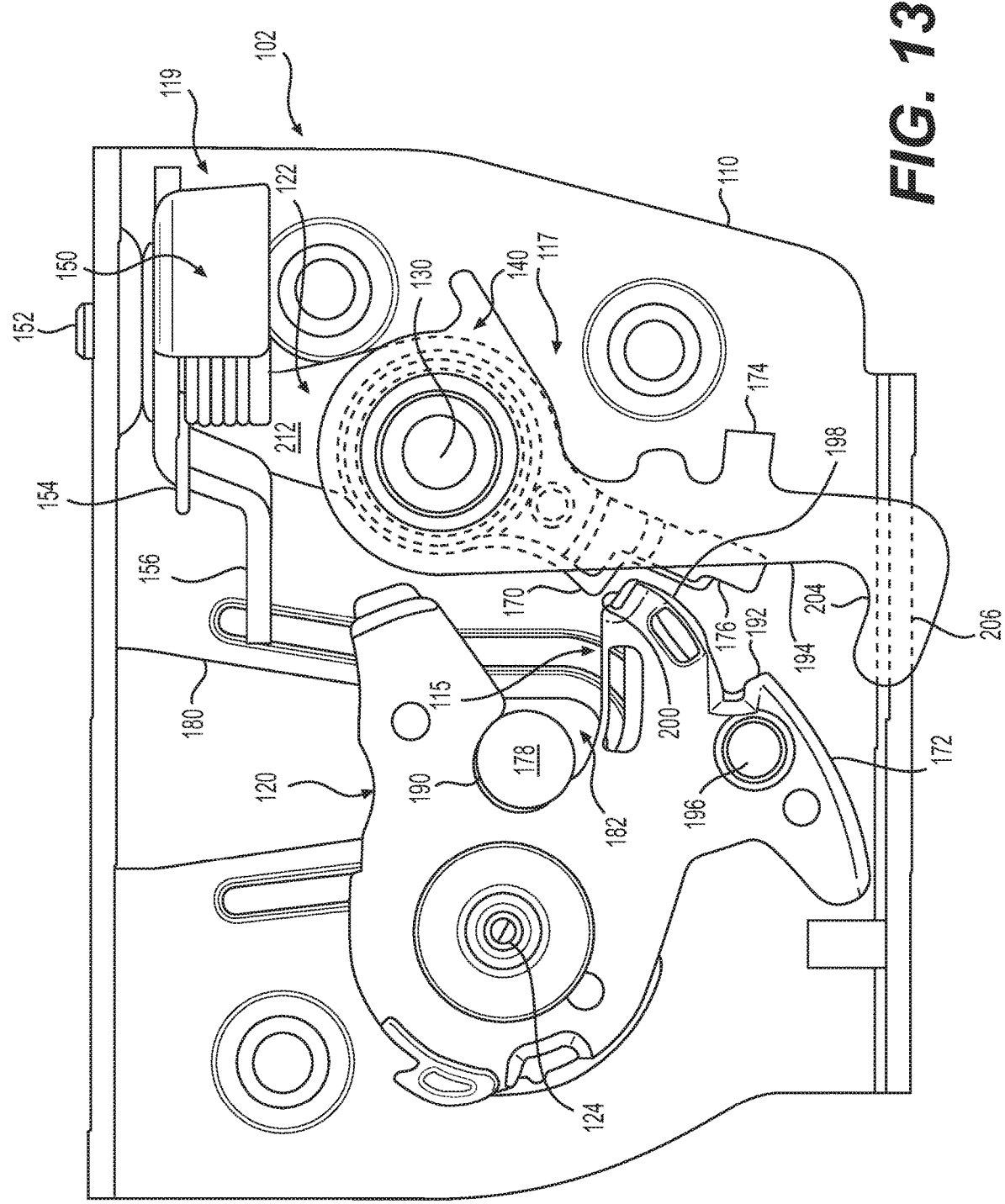
FIG. 13 is the fourth plan view of the closure latch assembly showing the ratchet rotated by the striker in the ratchet closing direction into an over-travel position upon full closure of the door.
Figure 14:
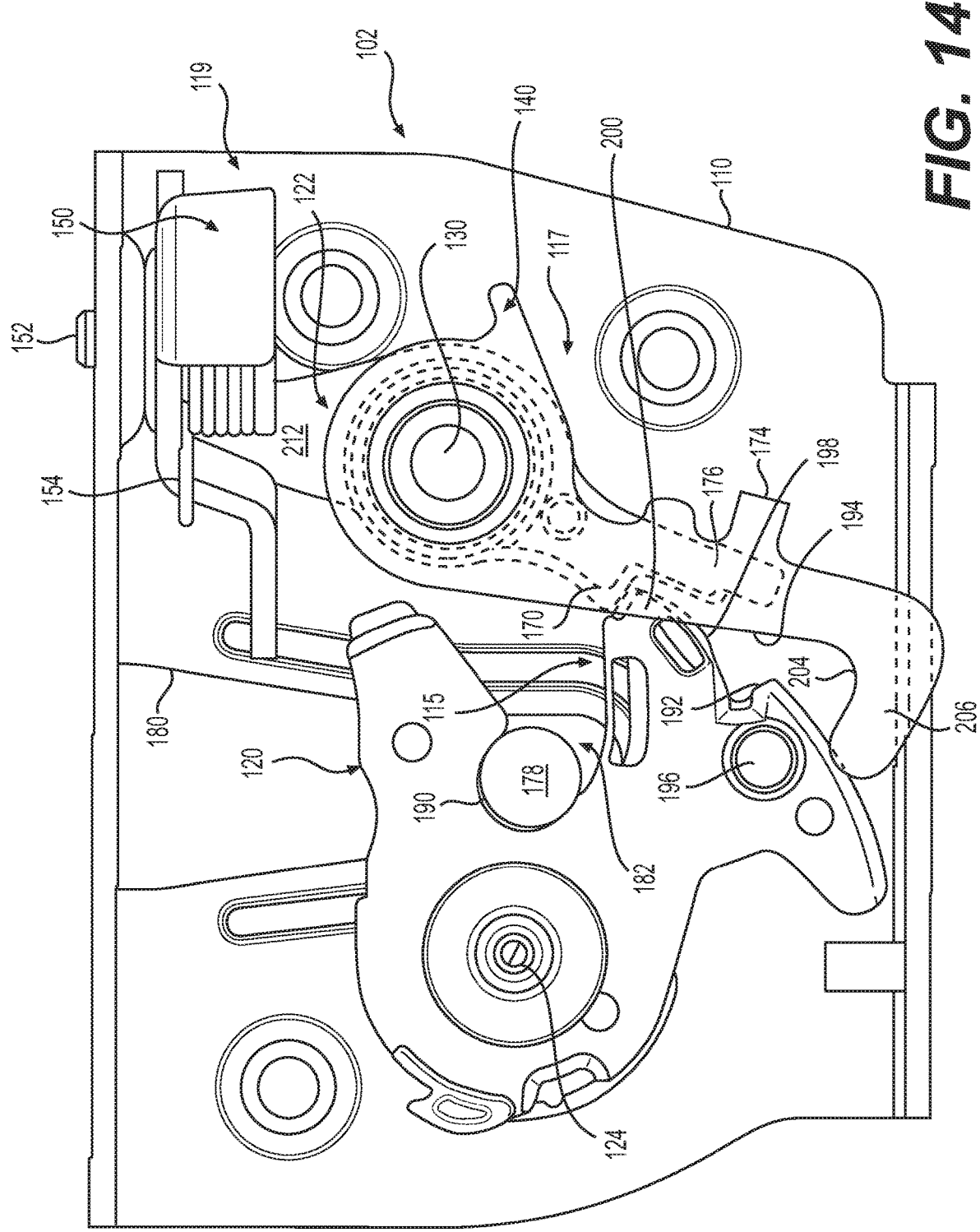
FIG. 14 is the fifth plan view of the closure latch assembly showing the ratchet slightly rotated in a ratchet releasing direction such that the ratchet is held by the pawl in a primary latched position so as to shift the latch mechanism into a primary latched mode while the anti-chucking mechanism begins to shift from its released mode into an engaged mode.
Figure 15:
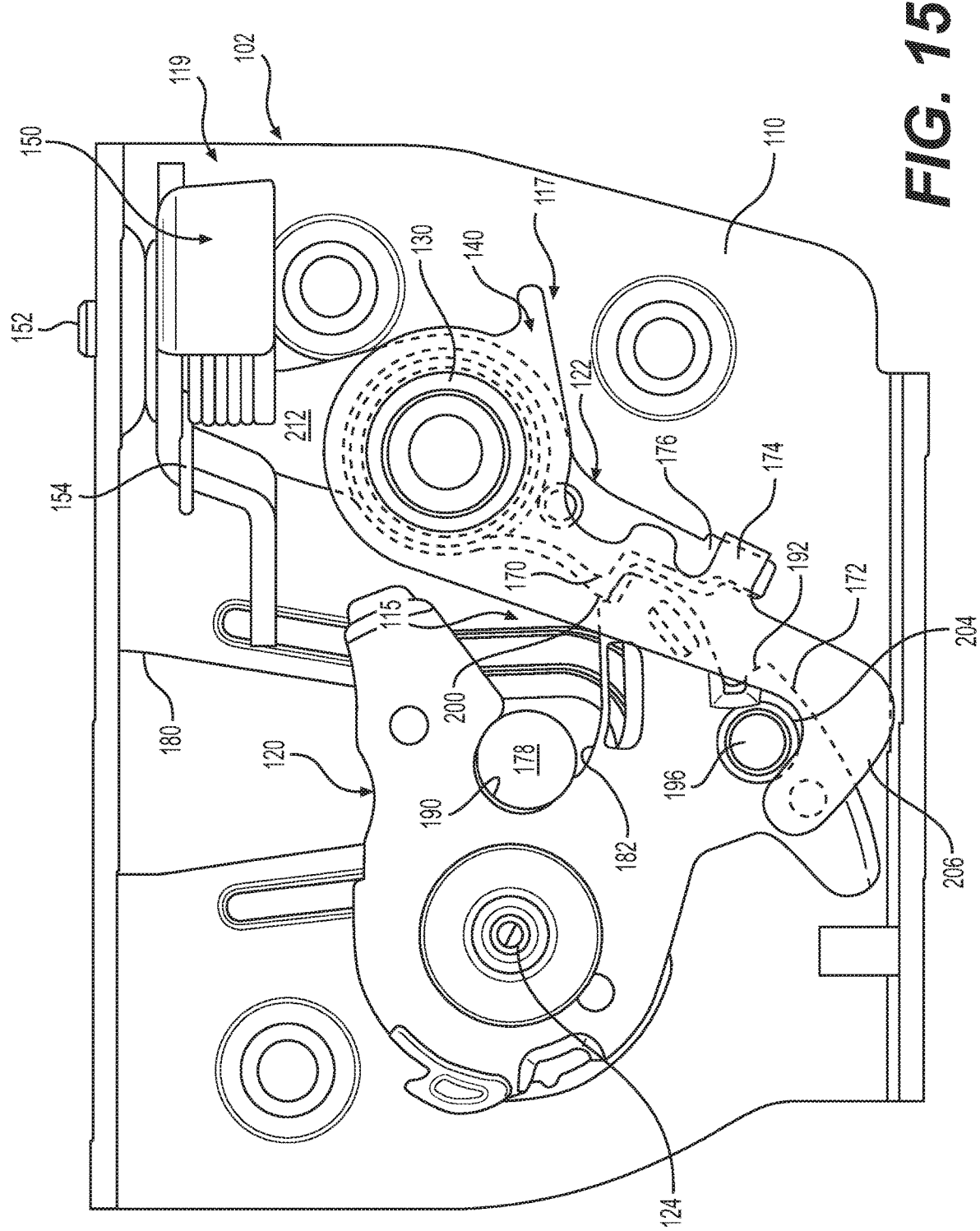
FIG. 15 is the sixth plan view of the closure latch assembly showing the latch mechanism in its primary latched mode and the anti-chucking mechanism in its engaged mode for cooperatively providing an anti-chucking function.

As ratchet 120 continues to rotate in the ratchet closing direction, pawl lug 170 will ride on a second ratchet cam surface 198 and initially move past a primary latch shoulder 200 formed on ratchet 120 as striker 178 causes ratchet 120 to move into its striker over-travel position shown in FIG. 13 due to door 22 being moved to its fully-closed (hard slam) position. This action causes pawl spring 132 for forcibly move pawl 122 into its ratchet holding position relative to ratchet 120, yet the over-travel of ratchet 120 does not result in latched engagement. However, FIG. 14 illustrates, subsequent slight rotation of ratchet 120 in a ratchet releasing (i.e. counterclockwise) direction due to the biasing of the ratchet spring 126, for causing pawl lug 170 to engage primary latch shoulder 200 on ratchet 120, thereby holding ratchet 120 in its primary striker capture position. Thereafter, anti-chuck spring 144 forcibly pivots anti-chuck lever 140 in the engaging direction until stop post 196 on ratchet 120 is retained in a latch shoulder 204 formed in a bent end segment 206 of lever 140, as is best seen in FIG. 15. Thus, anti-chuck lever 140 is located in its engaged position such that anti-chucking mechanism 117 is now operating in its engaged mode. To subsequently shift latch mechanism 115 into its unlatched mode, release cable 108 pulls on release lever 150 for causing it to move from its non-actuated position into its actuated position. Such pivotal movement of release lever 150 results in a tab segment 210 (shown in FIG. 7) thereon engaging a second leg segment 212 of pawl 122 for causing pawl 122 to forcibly move from its ratchet holding position into its ratchet releasing position, thereby permitting ratchet spring 126 to forcibly rotate ratchet 120 from its primary striker capture position (FIG. 15) back to its striker release position (FIG. 10).

Figure 16:
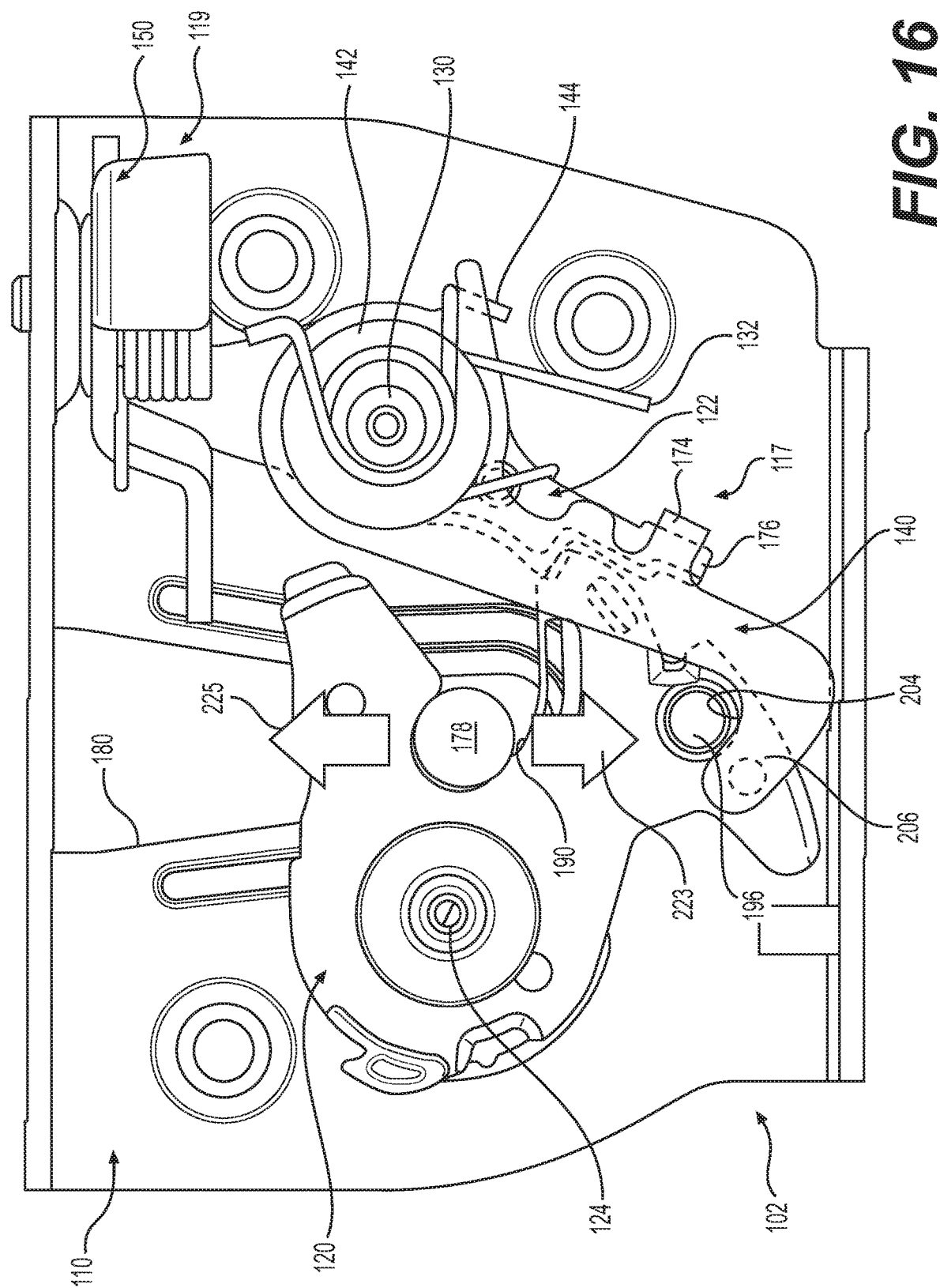
FIG. 16 is similar to FIG. 13 and illustrates the loading associated with striker movement in both ratchet closing and ratchet releasing directions relative to the latch mechanism when operating in its primary latched mode.
Figure 17:
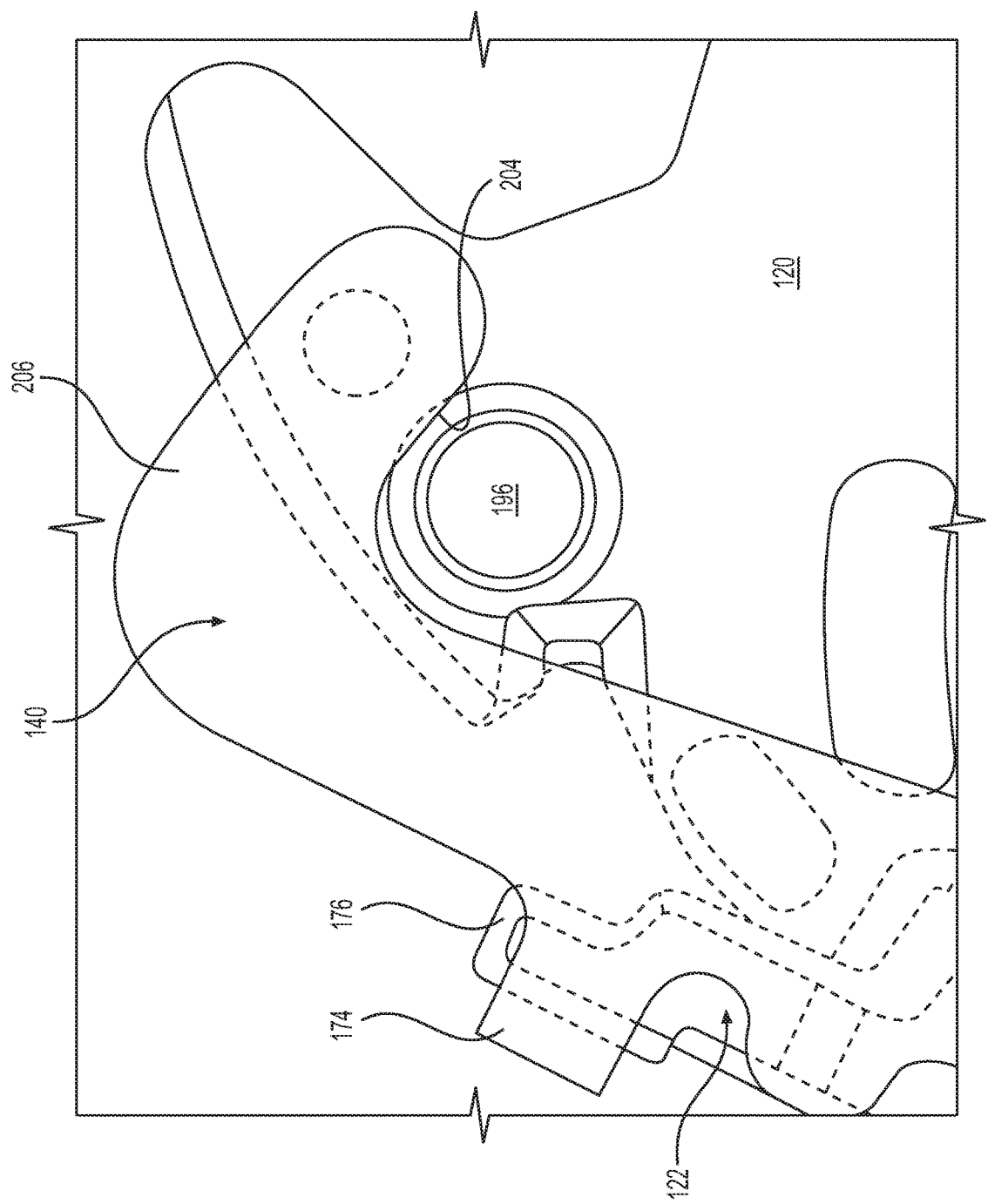
FIG. 17 is an enlarged partial view of FIG. 16 illustrating an engagement configuration between the ratchet of the latch mechanism and an anti-chuck lever of the anti-chucking mechanism.

Anti-chucking mechanism 117 is integrated with latch mechanism 115 to provide a solution for eliminating chucking movement between striker 178 and ratchet 120 along the pillar-less latching interface between front door 22 and rear door 28 relative to each other and/or relative to vehicle body 10. In particular, pawl 122 and anti-chuck lever 140 work cooperatively when ratchet 120 is located in its primary striker capture position to rigidly retain striker 178 with striker seat 190. FIG. 16 illustrates that pawl 122 will support a striker "push-out" load (arrow 225) exerted thereon by ratchet 120 in the traditional manner. However, anti-chuck lever 140 now supports a striker "push-in" load exerted thereon by ratchet 120, as indicated by arrow 223. Thus, noise generated due to relative movement between striker 178 and ratchet 120 is eliminated when ratchet 120 is held in its primary striker capture position since over-travel of ratchet 120 in the closing direction is no longer possible due to the engagement configuration between post 196 on ratchet 120 and latch shoulder 204 on anti-chuck lever 140. FIG. 17 illustrates that anti-chuck latch shoulder 204 on bent end segment 206 of anti-chuck lever 140 is formed to have a positive backout configuration to provide a "wedging" function to inhibit over-travel of ratchet 120.

Figure 18:
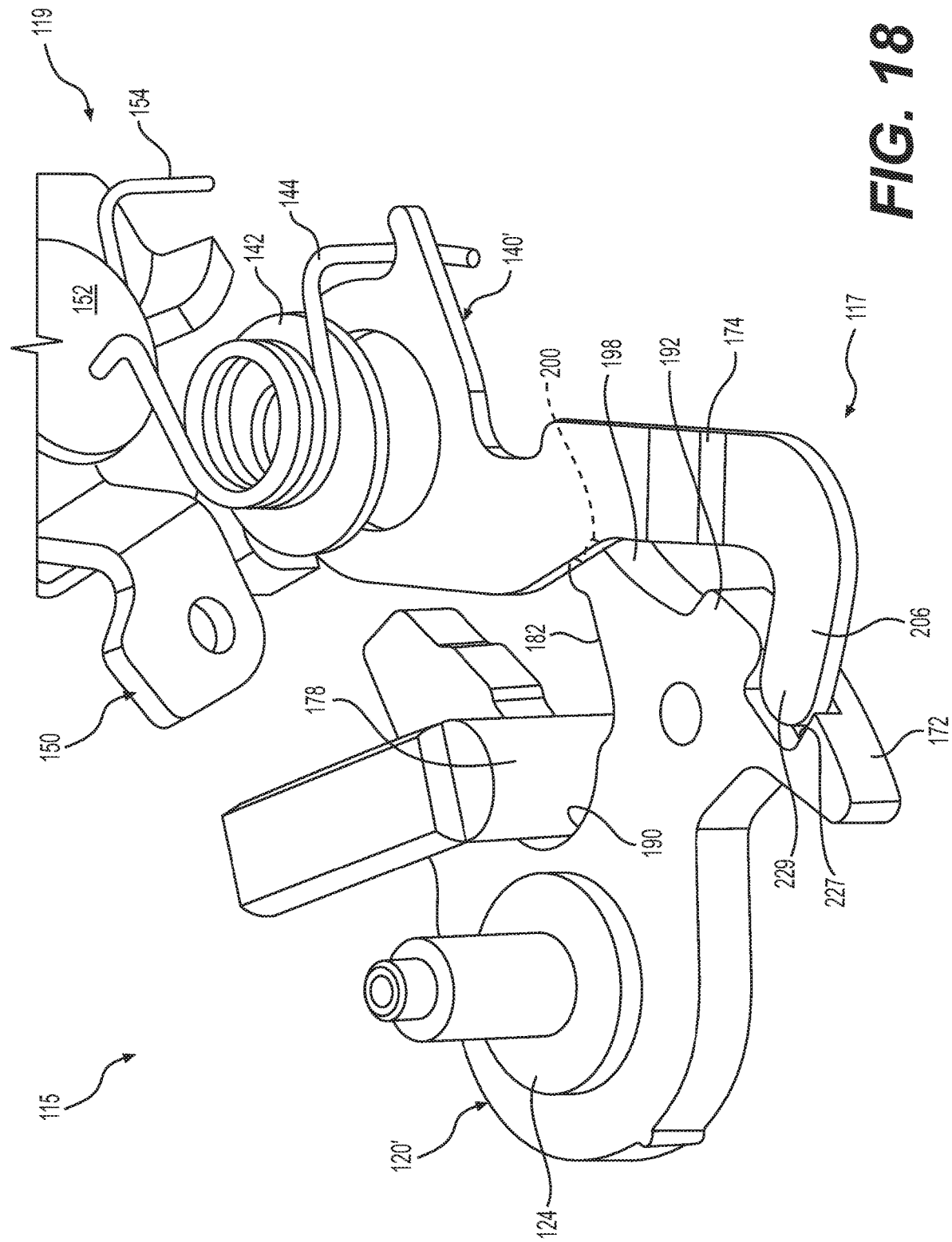
FIGS. 18 and 19 illustrate an alternative embodiment for an engagement configuration between the ratchet of the latch mechanism and the anti-chuck lever of the anti-chucking mechanism when the latch mechanism is in its primary latched mode and the anti-chucking mechanism is in its engaged mode.
Figure 19:
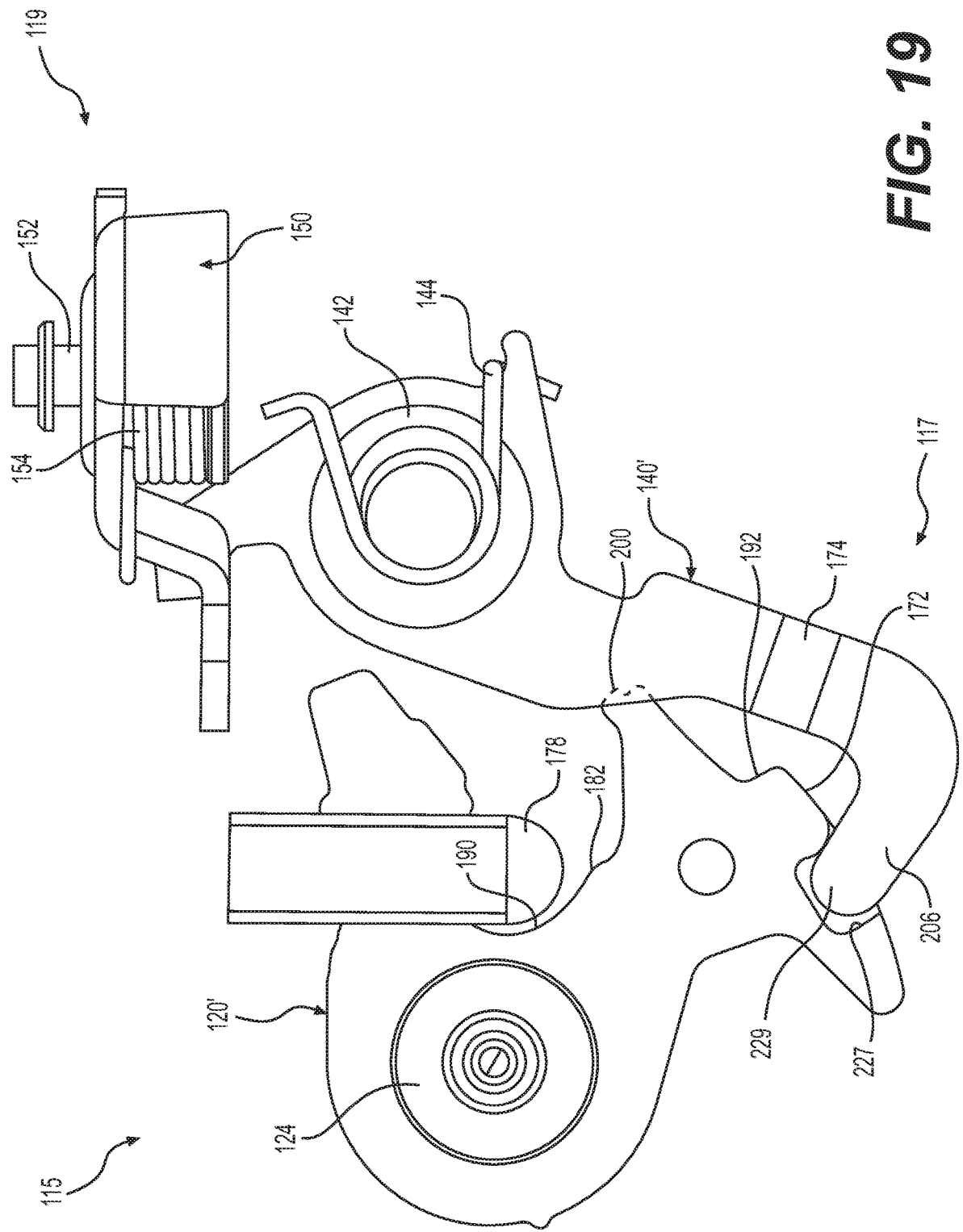

FIGS. 18 and 19 illustrate an alternative configuration for providing the anti-chucking function when ratchet 120' of latch mechanism 115 is held in its primary striker capture position by pawl 122. In particular, a latching notch 227 is formed in first cam segment 172 of ratchet 120' and is sized to receive and releaseably retain an end portion 229 of bent end segment 206 on anti-chuck lever 140'. With end portion 229 located within latching notch 227, anti-chuck lever 140' is located in its engaged position and over-travel of ratchet 120' in the push-in direction is inhibited, thereby providing the anti-chucking feature again directly between ratchet 120' and anti-chuck lever 140'. As before, movement of pawl 122 from its ratchet holding position to its ratchet release position causes corresponding movement of anti-chuck lever 140' from its engaged position into its released position, thereby releasing end portion 229 of anti-chuck lever 140' from latch notch 227 in ratchet 120'.

Referring now to FIGS. 20-30, another alternative configuration for the latch mechanism of closure latch assembly 48 will now be described to clearly indicate integration of an anti-chuck locking feature between the pawl and ratchet that is operable to hold the ratchet in its primary striker capture position and inhibit bi-directional relative movement between the striker and the ratchet. The previous two embodiments employed a separate anti-chucking mechanism 17, 117 configured to resist the striker "push-in" load exerted by the ratchet while the pawl resists the striker "push-out" load exerted by the ratchet in order to positively locate and hold the ratchet in its primary striker capture position. However, the embodiment shown and hereinafter disclosed in association with FIGS. 20-29 provides an alternative latch mechanism providing a less complicated anti-chucking feature.

FIGS. 20 through 28 provide a series of sequential views illustrating operation of closure latch assembly 48. In particular, FIG. 20 illustrates closure latch assembly 48 to now include a latch mechanism 215 and a latch release mechanism 219. Latch mechanism 215 includes a ratchet 220 and a pawl 222. Ratchet 220 is supported on frame plate 110 via a ratchet pivot post 224 for movement between a striker release position, a primary striker capture position, and a striker over-travel position. Ratchet 220 is normally biased toward its striker release position via a ratchet spring, shown schematically by arrow 226. Pawl 222 is supported on frame plate 110 via a pawl pivot post 230 for movement between a ratchet holding position and a ratchet releasing position. Pawl 222 is normally biased toward its ratchet holding position via a pawl spring 232. Latch mechanism 215 also includes an anti-rattle lever 240 and an anti-rattle lever spring 244. Anti-rattle lever 240 is supported on ratchet pivot post 224 for movement between a released position and an engaged position. Anti-rattle lever spring 244 normally biases anti-rattle lever 240 toward its released position.

Latch release mechanism 219 is shown to include a release lever 250 fixed to, or integrally formed with, pawl 222. As such, movement of release lever 250 between a non-actuated position and an actuated position functions to cause corresponding movement of pawl 222 between its ratchet holding position and its ratchet releasing position. A connection device, such as a cable or rod 208 is adapted to be attached between release lever 250 and door handle 50 so as to move pawl 222 from its ratchet holding position into its ratchet releasing position in response to actuation of door handle 50. Those skilled in the art understand that a non-direct operative connection between pawl 222 and release lever 250 can be used in substitution for the direct connection disclosed.

FIG. 20 illustrates latch mechanism 215 in an unlatched mode. Specifically, ratchet 220 is shown rotated in a ratchet releasing (i.e. counterclockwise) direction into its striker release position, pawl 222 is shown rotated in a pawl engaging (i.e. counterclockwise) direction into its ratchet holding position, and anti-rattle lever 240 is shown rotated in a first (i.e. counterclockwise) direction into its released position.

Referring next to FIG. 21, striker 172 is shown entering fishmouth segment 180 of frame plate 110 upon movement of door 22 toward its closed position and initially engaging a first lug segment 221 of ratchet 220 and entering ratchet guide channel 282, thereby forcing ratchet 220 to rotate in the ratchet closing (i.e. clockwise) direction from its striker release position toward its primary striker capture position, in opposition to the biasing of ratchet spring 226. FIG. 22 illustrates that continued rotation of ratchet 220 in its ratchet closing condition, causes an outer drive surface 252 on ratchet 220 to engage a drive lug 254 formed on anti-rattle lever 240, thereby forcibly rotating anti-rattle lever 240 in a second (i.e. clockwise) direction from its released position toward its engaged position, in opposition to the biasing of lever spring 244.

FIGS. 23A and 23B illustrate that continued rotation of ratchet 220 in its ratchet closing direction causes a drive cam 256 formed on anti-rattle lever 240 to engage a driven cam 258 formed on pawl 222 and forcibly pivot pawl 222 from its ratchet holding position in a pawl releasing (i.e. clockwise) direction toward its ratchet releasing position, in opposition to the biasing of pawl spring 232.

FIG. 24 illustrates that continued rotation of ratchet 220 in its ratchet closing direction, due to continued engagement with striker 172, eventually results in release of engagement between drive cam 256 on anti-rattle lever 240 and driven cam 258 on pawl 222. As such, pawl spring 232 is permitted to rotate pawl 222 in its pawl engaging direction until a lock tooth 260 formed on pawl 222 engages and slides along a first cam edge portion 262 formed on a second lug segment 263 of ratchet 220.

FIG. 25 illustrates that continued rotation of ratchet 220 in its ratchet closing direction causes lock tooth 260 on pawl 222 to disengage first cam edge portion 262 of ratchet 220 and become generally aligned with a lock notch 264 formed in second lug segment 263 when ratchet 220 has been rotated by striker 172 to its striker over-travel position. At this point, pawl spring 232 forcibly rotates pawl 222 in its pawl engaging direction until an edge surface 266 of lock tooth 260 contacts a second cam edge portion 268 formed on second lug segment 263 of ratchet 220. Second cam edge portion 268 is offset relative to first cam edge portion 262. This camming engagement, in cooperation with the biasing of ratchet spring 226, results in ratchet 220 rotating slightly in its ratchet opening direction from its striker over-travel position into its primary striker capture position, as is best seen from FIG. 26. Preferably, second cam edge portion 268 is contoured to cooperate with surface 266 of tooth 260 and provide a tooth alignment function.

As seen from FIG. 27, lock tooth 260 subsequently partially enters and is retained in lock notch 264 due to pawl spring 232 continuing to bias pawl 222 toward its ratchet holding position. FIGS. 28 and 29 illustrate lock tooth 260 on pawl 222 completely retained within lock notch 264 in ratchet 220 so as to provide the anti-chucking locking feature. This tooth-type locking feature inhibits movement of ratchet 220 in either of its ratchet releasing and ratchet closing directions, thereby providing a self-locking ratchet configuration. FIG. 29 illustrates the low clearance, highly dimensionally stable locking arrangement between the outer profile of lock tooth 260 and the inner profile of lock notch 264. Points A and C indicate "pinch" points configured to provide a bi-directional wedging effect, thereby establishing the tooth-type locking feature. As such, large-scale fine blanked production of ratchet 220 and pawl 222 can be controlled to the 0.1 mm tolerance range.

To release latch mechanism 215 and shift it from its latched mode (FIG. 28) back into its unlatched mode (FIG. 20), release lever 250 is pivoted by actuation of handle 50 from its non-actuated position into its actuated position for causing concurrent pivotal movement of pawl 222 from its ratchet holding position into its ratchet releasing position for releasing lock tooth 260 from retention within lock notch 264. Ratchet 220 and pawl 222 are designed with an over-travel locking interface established between lock tooth 260 and lock notch 264 having a slight backout surface profile to allow proper engagement without tooth blocking conditions. As seen, the locking feature occurs when ratchet 220 slightly backs out from its striker over-travel position toward its primary striker capture position so as to facilitate smooth sliding movement of lock tooth 260 into lock notch 264 and permit complete travel of pawl 222 into its ratchet holding position. Once lock tooth 260 is engaged within lock notch 264, contact points (Points A and C) between tooth 260 and lock notch 264 inhibit relative movement of ratchet 220 relative to striker 172, thereby preventing chucking and its related undesirable noise. Thus, ratchet 220 is self-locking in both directions.

While latch mechanism 215 and latch release mechanism 219 have been described in association with a closure latch assembly of the type used in vehicular closure systems, it should be understood that these teachings are directly applicable to other types of latch assemblies such as, for example, a seat latch assembly for vehicular seating systems. In either type of latching system, this self-locking, anti-chucking arrangement between the ratchet and pawl of the latch mechanism provides significant advancement over conventional arrangements and effectively prevents, or significantly limits, vibrations and related noise.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A latch assembly for a motor vehicle latching system, the latch assembly comprising:
   a latch mechanism having a ratchet moveable between a striker release position, a striker capture position, and a striker over-travel position, a ratchet spring for biasing the ratchet toward its striker release position, a pawl moveable between a ratchet holding position for holding the ratchet in its striker capture position and a ratchet releasing position for permitting the ratchet to move to its striker release position, and a pawl spring for biasing the pawl toward its ratchet holding position; and
   a latch release mechanism operable for moving the pawl from its ratchet holding position into its ratchet releasing position;
   wherein the latch mechanism has an anti-chuck locking feature including a lug segment defining a lock notch on the ratchet and a lock tooth on the pawl, said lock tooth being arranged to be releaseably disposed within the lock notch when the ratchet is located in its striker capture position and the pawl is located in its ratchet holding position to inhibit movement of the ratchet toward the striker release position and the striker over-travel position;
   wherein the latch mechanism further includes an anti-rattle lever moveable between a released position and an engaged position, and a lever spring for biasing the anti-rattle lever toward its released position, and wherein movement of the ratchet from its striker release position to its striker capture position causes concurrent movement of the anti-rattle lever from its released position to its engaged position, whereupon the anti-rattle lever engages the pawl to move the pawl from its ratchet holding position against a bias of the pawl spring to its ratchet releasing position to facilitate movement of the ratchet from its striker release position to its striker capture position;
   wherein the anti-rattle lever includes a drive cam adapted to engage a driven cam formed on the pawl in response to movement from its released position to its engaged position for causing corresponding movement of the pawl from its ratchet holding position toward its ratchet releasing position.

2. The latch assembly of claim 1, wherein the latch assembly is a closure latch assembly for use in a vehicular closure system.

3. The latch assembly of claim 1, wherein the latch assembly is a seat latch assembly for use in a vehicular seating system.

4. The latch assembly of claim 1, wherein the lug segment on the ratchet includes first and second cam surfaces located on opposite sides of the lock notch, and wherein the first cam surface is radially offset relative to the second cam surface.

5. The latch assembly of claim 4, wherein the lock tooth on the pawl engages and slides along the first cam surface as the ratchet moves from its striker capture position so as to hold the pawl in its ratchet releasing position, and wherein movement of the ratchet from its striker capture position to its striker over-travel position causes the pawl spring to move the pawl toward its ratchet holding position until the lock tooth on the pawl engages the second cam surface of the lug segment.

6. The latch assembly of claim 5, wherein engagement of the lock tooth with the second cam surface allows the ratchet spring to move the ratchet back to its striker capture position, whereby the lock tooth is aligned with the lock notch so as to permit the pawl spring to move the pawl into its ratchet holding position whereat the lock tooth is lockingly retained within the lock notch.

7. The latch assembly of claim 6, wherein the profile of the lock tooth on the pawl and the lock notch on the ratchet are configured to inhibit movement of the ratchet in a ratchet releasing direction toward its striker release position and to inhibit movement of the ratchet in a ratchet closing direction toward its striker over-travel position thereby establishing the anti-chuck feature.

8. A latch assembly for a motor vehicle latching system, the latch assembly comprising:
a latch mechanism having a ratchet moveable between a striker release position, a striker capture position, and a striker over-travel position, a ratchet spring for biasing the ratchet toward its striker release position, a pawl moveable between a ratchet holding position for holding the ratchet in its striker capture position and a ratchet releasing position for permitting the ratchet to move to its striker release position, and a pawl spring for biasing the pawl toward its ratchet holding position; and
a latch release mechanism operable for moving the pawl from its ratchet holding position into its ratchet releasing position;
wherein the latch mechanism has an anti-chuck locking feature including a lug segment defining a lock notch on the ratchet and a lock tooth on the pawl, said lock tooth being arranged to be releaseably disposed within the lock notch when the ratchet is located in its striker capture position and the pawl is located in its ratchet holding position to inhibit movement of the ratchet toward the striker release position and the striker over-travel position, wherein the anti-rattle lever includes a drive lug and the ratchet includes an outer drive surface, and wherein rotation of ratchet in a ratchet closing condition causes the outer drive surface on the ratchet to engage the drive lug on the anti-rattle lever and forcibly rotates the anti-rattle lever from its released position towards its engaged position.

9. A latch assembly for a motor vehicle latching system, the latch assembly comprising:
a latch mechanism having a ratchet, a ratchet spring, a pawl, and a pawl spring, the ratchet including a lug segment defining a lock notch and being moveable between a striker release position, a striker capture position, and a striker over-travel position, the ratchet spring biasing the ratchet toward its striker release position, the pawl including a lock tooth and being moveable between a ratchet holding position whereat the pawl holds the ratchet in its striker capture position and a ratchet releasing position whereat the pawl is disengaged from the ratchet and permits the ratchet spring to drive the ratchet to its striker release position, the pawl spring biasing the pawl towards its ratchet holding position;
a latch release mechanism for selectively moving the pawl from its ratchet holding position into its ratchet releasing position; and
wherein the latch mechanism has an anti-chuck locking feature established by the lock tooth on the pawl being seated within the lock notch on the ratchet when the ratchet is held in its striker capture position by the pawl in its ratchet holding position, the profile of the lock tooth and the lock notch being configured to inhibit movement of the ratchet in a ratchet releasing direction towards its striker release position and to inhibit movement of the ratchet in a ratchet closing direction towards its striker over-travel position;
wherein the lug segment includes first and second cam surfaces located on opposite sides of the lock notch, wherein the lock tooth on the pawl engages and rides along the first cam surface as the ratchet moves in a ratchet closing direction from its striker release position toward its striker capture position so as to hold the pawl in its ratchet releasing position, and wherein movement of the ratchet in the ratchet closing direction from its striker capture position into its striker over-travel position causes the pawl spring to move the pawl toward its ratchet holding position until the lock tooth on the pawl engages the second cam surface of the lug segment on the ratchet;
wherein the latch mechanism further includes an anti-rattle lever moveable between a released position and an engaged position, and a lever spring for biasing the anti-rattle lever toward its released position, and wherein movement of the ratchet from its striker release position to its striker capture position causes concurrent movement of the anti-rattle lever from its released position to its engaged position, whereupon the anti-rattle lever engages the pawl to move the pawl from its ratchet holding position against a bias of the pawl spring to its ratchet releasing position to facilitate movement of the ratchet from its striker release position to its striker capture position;
wherein the anti-rattle lever includes a drive cam adapted to engage a driven cam formed on the pawl in response to movement from its released position to its engaged position for causing corresponding movement of the pawl from its ratchet holding position toward its ratchet releasing position.

10. The latch assembly of claim 9, wherein the latch assembly is a closure latch assembly for use in a vehicle door latching system.

11. The latch assembly of claim 9, wherein the latch assembly is a seat latch assembly for use in a vehicular seat latching system.

12. A latch assembly for a motor vehicle latching system, the latch assembly comprising:
a latch mechanism having a ratchet, a ratchet spring, a pawl, and a pawl spring, the ratchet including a lug segment defining a lock notch and being moveable between a striker release position, a striker capture position, and a striker over-travel position, the ratchet spring biasing the ratchet toward its striker release position, the pawl including a lock tooth and being moveable between a ratchet holding position whereat the pawl holds the ratchet in its striker capture position and a ratchet releasing position whereat the pawl is disengaged from the ratchet and permits the ratchet spring to drive the ratchet to its striker release position, the pawl spring biasing the pawl towards its ratchet holding position;
a latch release mechanism for selectively moving the pawl from its ratchet holding position into its ratchet releasing position; and
wherein the latch mechanism has an anti-chuck locking feature established by the lock tooth on the pawl being seated within the lock notch on the ratchet when the ratchet is held in its striker capture position by the pawl in its ratchet holding position, the profile of the lock tooth and the lock notch being configured to inhibit movement of the ratchet in a ratchet releasing direction towards its striker release position and to inhibit movement of the ratchet in a ratchet closing direction towards its striker over-travel position, wherein the anti-rattle lever includes a drive lug and the ratchet includes an outer drive surface, and wherein rotation of ratchet in a ratchet closing condition causes the outer drive surface on the ratchet to engage the drive lug on the anti-rattle lever and forcibly rotates the anti-rattle lever from its released position towards its engaged position.

13. A latch assembly for a motor vehicle latching system, the latch assembly comprising:
   a latch mechanism having a ratchet, a ratchet spring, a pawl, and a pawl spring, the ratchet including a lug segment defining a lock notch and being moveable between a striker release position, a striker capture position, and a striker over-travel position, the ratchet spring biasing the ratchet toward its striker release position, the pawl including a lock tooth and being moveable between a ratchet holding position whereat the pawl holds the ratchet in its striker capture position and a ratchet releasing position whereat the pawl is disengaged from the ratchet and permits the ratchet spring to drive the ratchet to its striker release position, the pawl spring biasing the pawl towards its ratchet holding position;
   a latch release mechanism for selectively moving the pawl from its ratchet holding position into its ratchet releasing position;
   wherein the latch mechanism has an anti-chuck locking feature established by the lock tooth on the pawl being seated within the lock notch on the ratchet when the ratchet is held in its striker capture position by the pawl in its ratchet holding position, the profile of the lock tooth and the lock notch being configured to inhibit movement of the ratchet in a ratchet releasing direction towards its striker release position and to inhibit movement of the ratchet in a ratchet closing direction towards its striker over-travel position; and
   wherein the lug segment includes first and second cam surfaces located on opposite sides of the lock notch, wherein the lock tooth on the pawl engages and rides along the first cam surface as the ratchet moves in a ratchet closing direction from its striker release position toward its striker capture position so as to hold the pawl in its ratchet releasing position, and wherein movement of the ratchet in the ratchet closing direction from its striker capture position into its striker over-travel position causes the pawl spring to move the pawl toward its ratchet holding position until the lock tooth on the pawl engages the second cam surface of the lug segment on the ratchet;
   wherein the latch mechanism further includes an anti-rattle lever moveable between a released position and an engaged position, and a lever spring for biasing the anti-rattle lever toward its released position, and wherein movement of the ratchet from its striker release position to its striker capture position causes concurrent movement of the anti-rattle lever from its released position to its engaged position, whereupon the anti-rattle lever engages the pawl to move the pawl from its ratchet holding position against a bias of the pawl spring to its ratchet releasing position to facilitate movement of the ratchet from its striker release position to its striker capture position;
   wherein the anti-rattle lever includes a drive cam adapted to engage a driven cam formed on the pawl in response to movement from its released position to its engaged position for causing corresponding movement of the pawl from its ratchet holding position toward its ratchet releasing position.

* * * * *